(12) United States Patent
Gibson et al.

(10) Patent No.: US 11,900,491 B2
(45) Date of Patent: Feb. 13, 2024

(54) SYSTEMS AND METHODS FOR EXECUTING AND DELIVERING ELECTRONIC DOCUMENTS

(71) Applicant: SYNGRAFII INC., Toronto (CA)

(72) Inventors: Thomas Matthew Mann Gibson, Toronto (CA); Ravi Vipool Dave, Etobicoke (CA); Christian D. J. Sleight, Mississauga (CA)

(73) Assignee: SYNGRAFII INC., Toronto (CA)

( * ) Notice: Subject to any disclaimer, the term of this patent is extended or adjusted under 35 U.S.C. 154(b) by 426 days.

(21) Appl. No.: 16/499,405

(22) PCT Filed: Mar. 28, 2018

(86) PCT No.: PCT/CA2018/050378
§ 371 (c)(1),
(2) Date: Sep. 30, 2019

(87) PCT Pub. No.: WO2018/176140
PCT Pub. Date: Oct. 4, 2018

(65) Prior Publication Data
US 2020/0258176 A1    Aug. 13, 2020

Related U.S. Application Data

(60) Provisional application No. 62/479,764, filed on Mar. 31, 2017.

(51) Int. Cl.
*G06F 17/00* (2019.01)
*G06Q 50/18* (2012.01)
(Continued)

(52) U.S. Cl.
CPC ......... *G06Q 50/18* (2013.01); *G06F 3/04883* (2013.01); *G06F 21/32* (2013.01);
(Continued)

(58) Field of Classification Search
CPC .... G06Q 50/18; G06Q 10/083; G06Q 10/103; G06Q 30/0185; G06Q 10/107;
(Continued)

(56) References Cited

U.S. PATENT DOCUMENTS 6,151,609 A * 11/2000 Truong ................ G06F 40/174
709/219
7,739,511 B2 * 6/2010 Horne .................... G06N 7/005
713/176

(Continued)

FOREIGN PATENT DOCUMENTS

EP    1280098 A1    1/2003
JP    2014-194751 A  10/2014
(Continued)

OTHER PUBLICATIONS

EPO, extended European search report for European Application No. 18774741.5 dated Sep. 15, 2020.
(Continued)

*Primary Examiner* — Mohammed H Zuberi
(74) *Attorney, Agent, or Firm* — Norton Rose Fulbright Canada LLP

(57) ABSTRACT

A computer-implemented system and method for annotating or signing an electronic document are provided. The method includes steps of: receiving or retrieving an electronic document available for annotation or execution by one or more parties; transmitting the electronic document for display on a first computing device to the first computing device at a first location; authenticating an identity of a first user of the first computing device; receiving electronic signals representing an user input of the first user from the first computing device; generating digital data representative of an indicia based the user input of the first user from the first computing device; and applying the digital data to the
(Continued)

electronic document to form a first annotation or signature from the first user.

18 Claims, 34 Drawing Sheets

(51) Int. Cl.
| | |
|---|---|
| G06F 40/169 | (2020.01) |
| G06F 3/04883 | (2022.01) |
| G06F 21/32 | (2013.01) |
| G06F 21/33 | (2013.01) |
| G06F 21/64 | (2013.01) |
| G06Q 10/083 | (2023.01) |
| G06Q 10/10 | (2023.01) |
| G06Q 30/018 | (2023.01) |
| G06Q 10/107 | (2023.01) |

(52) U.S. Cl.
CPC .............. *G06F 21/33* (2013.01); *G06F 21/64* (2013.01); *G06F 40/169* (2020.01); *G06Q 10/083* (2013.01); *G06Q 10/103* (2013.01); *G06Q 30/0185* (2013.01); *G06Q 10/107* (2013.01)

(58) Field of Classification Search
CPC .... G06F 40/169; G06F 3/04883; G06F 21/32; G06F 21/33; G06F 21/64
See application file for complete search history.

(56) References Cited

U.S. PATENT DOCUMENTS

| | | | | |
|---|---|---|---|---|
| 7,970,722 | B1* | 6/2011 | Owen | G06N 20/00 |
| | | | | 706/46 |
| 8,341,141 | B2* | 12/2012 | Krislov | G06Q 10/10 |
| | | | | 707/707 |
| 8,549,303 | B2* | 10/2013 | Fifield | H04L 63/12 |
| | | | | 707/703 |
| 8,572,134 | B2* | 10/2013 | Van Rooyen | G06F 16/25 |
| | | | | 707/812 |
| 10,210,570 | B2* | 2/2019 | Bennett | G06Q 30/0601 |
| 10,212,144 | B2* | 2/2019 | Guthery | H04L 63/126 |
| 10,713,714 | B2* | 7/2020 | Porter | G06F 40/174 |
| 2002/0046222 | A1* | 4/2002 | Shinohara | G06Q 10/107 |
| | | | | 709/206 |
| 2004/0199876 | A1* | 10/2004 | Ethier | G06F 40/117 |
| | | | | 715/236 |
| 2005/0177389 | A1* | 8/2005 | Rakowicz | G06Q 50/167 |
| | | | | 713/157 |
| 2008/0028220 | A1* | 1/2008 | Wyssen | H04N 1/00129 |
| | | | | 713/176 |
| 2008/0292130 | A1* | 11/2008 | Nafarieh | G06V 10/28 |
| | | | | 382/100 |
| 2009/0164791 | A1 | 6/2009 | Lee et al. | |
| 2009/0265641 | A1 | 10/2009 | Gibson et al. | |
| 2010/0191760 | A1* | 7/2010 | Kusumura | G06F 16/258 |
| | | | | 707/767 |
| 2010/0284033 | A1 | 11/2010 | Popovic et al. | |
| 2011/0179289 | A1* | 7/2011 | Guenther | G06F 21/83 |
| | | | | 713/189 |
| 2012/0221944 | A1* | 8/2012 | Bloomfield | G06Q 10/10 |
| | | | | 715/255 |
| 2014/0195899 | A1* | 7/2014 | Bastide | G06F 40/166 |
| | | | | 715/256 |
| 2014/0241591 | A1 | 8/2014 | Matsuki | |
| 2015/0067347 | A1 | 3/2015 | Dease et al. | |
| 2015/0150141 | A1* | 5/2015 | Szymanski | G06F 21/64 |
| | | | | 726/26 |
| 2015/0220649 | A1* | 8/2015 | Papa | G06F 16/9535 |
| | | | | 707/722 |
| 2015/0325022 | A1* | 11/2015 | Betz | G06T 11/203 |
| | | | | 345/467 |
| 2016/0048696 | A1 | 2/2016 | Follis | |
| 2016/0247245 | A1 | 8/2016 | Baic | |
| 2016/0292804 | A1 | 10/2016 | Takahashi et al. | |
| 2016/0321214 | A1* | 11/2016 | Hickey | G06F 40/169 |
| 2017/0185580 | A1* | 6/2017 | Zhang | G06T 11/00 |
| 2018/0053265 | A1* | 2/2018 | Lyon | G06Q 40/025 |
| 2019/0213604 | A1* | 7/2019 | Meadows | G06Q 30/0185 |
| 2022/0253202 | A1* | 8/2022 | Fu | G06T 11/001 |

FOREIGN PATENT DOCUMENTS

| | | |
|---|---|---|
| JP | 2016-192719 A | 11/2016 |
| WO | 00/062220 A1 | 10/2000 |
| WO | 2007034255 A1 | 3/2007 |

OTHER PUBLICATIONS

WIPO, International Search Report and Written Opinion for PCT Application No. PCT/CA2018/050378 dated Jun. 21, 2018.
JPO, Office Action for JP Application No. 2020-502742 dated Mar. 10, 2022.
EP Examination Report dated Oct. 28, 2022 issued in European Application No. 18774741.5.

* cited by examiner

Signature Solutions

Frank Dave (/tws_dev/Manage)  Log off

Home   Contact   Sign   Manage Signings   MasterFile   Admin

MasterFile Certificate          7000
All dates and times shown are in UTC

📄 Loan JSmith-Form.pdf | 3 pages | 118.49 KB ← 3500

| | |
|---|---|
| Folder Name | Demo for Bob |
| Document Owner | Frank Dave (fdave@email.com) |
| Uploaded On | Thursday, February 09, 2017 3:28:39 PM |
| Uploaded From | TWS Web |

🕘 File History ▾

Signing Status ← 7100

- 1. Jeff Flake (jflake@email.com): ✔ Signed on 2/9/2017 3:43:11 PM
  Signing location:  Queen St W, Toronto, ON M5V 1Z8, Canada (43.6500331,-79.391594)

FIG. 9A

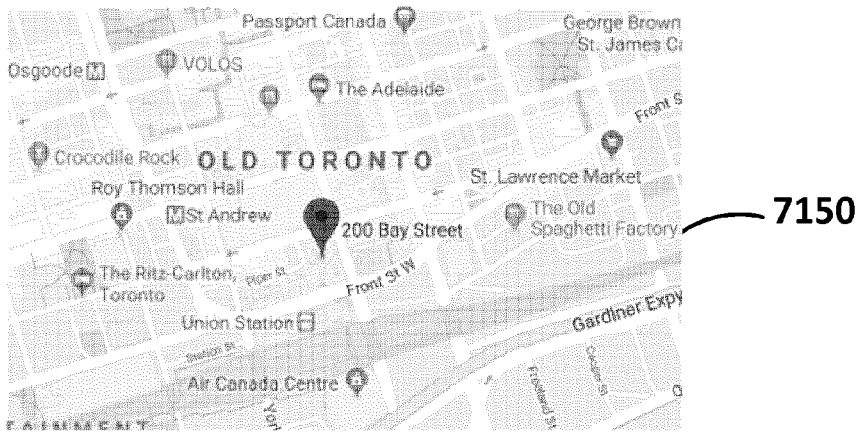
— 7150

Messaging Log — 7200

- Signature Link sent by Email to *jflake@email.com* at 2/9/2017 3:37:11PM
- Signature Link sent by Text Message to 4165555951 at 2/9/2017 3:37:11PM
- Signature Link sent by Email to *mmothra@email.com* at 2/9/2017 3:41:15PM
- Signature Link sent by Text Message to 4165557514 at 2/9/2017 3:41:15PM
- MasterFile Link sent by Email to *fdave@email.com* at 2/9/2017 4:09:54 PM Document Access History — 7300

- Thursday, February 09, 2017 3:29:29 PM: *fdave@email.com* from IP Address: 38.00.163.58

Peripheral Device Signatures — 7400

The following is the history of the signatures that were added:

- jflake@email.com: added from Phone (4165555951) at IP Address: 38.00.163.58
  Added: 2/9/2017 3:38:13 PM | Used: 2/9/2017 3:38:14 PM
- jflake@email.com: added from Phone (4165555951) at IP Address: 38.00.163.58
  Added: 2/9/2017 3:39:06 PM | Used: 2/9/2017 3:39:06 PM
- jflake@email.com: added from Phone (4165555951) at IP Address: 38.00.163.58
  Added: 2/9/2017 3:40:11 PM | Used: 2/9/2017 3:40:11 PM
- fdave@syngrafii.com : added from Phone (4165557514) at IP Address:
  38.00.163.58 Added: 2/9/2017 3:41:31 PM | Used: 2/9/2017 3:41:31 PM Peripheral Device Images — 7500

The following is the history of the images that were added:

FIG. 9B

- jflake@email.com: added from Phone (4165555951) at IP Address: 38.00.163.58
  Added: 2/9/2017 3:40:40 PM | Used 2/9/2017 3:40:40 PM
- fdave@email.com: added from Phone (4165557514) at IP Address: 38.00.163.58
  Added: 2/9/2017 3:41:59 PM | Used 2/9/2017 3:41:59 PM

Signing Log 7600

1. Frank Dave (fdave@email.com)

Summary

| | |
|---|---|
| Textboxes Inserted | 1 |
| Signatures Inserted | 4 |
| Ink Annotations Made | 1 |
| Total Signing Time | 0 hours 13 minutes 31 seconds |

Details

| | | | |
|---|---|---|---|
| 2/9/2017 3:34:09 PM | File has been Opened | | 33 Adelaide St W, Toronto, ON M5H 1T1, Canada (43.6496986, -79.383321)<br>38.00.163.58 |
| 2/9/2017 3:38:32 PM | Page 1: Exited Page | 4 minutes 23 seconds | 25 Queen St W, Toronto, ON M5V 1Z8, Canada (43.6500331, -79.391594)<br>38.00.163.58 |
| 2/9/2017 3:38:32 PM | Page 2: Entered Page | | 25 Queen St W, Toronto, ON M5V 1Z8, Canada (43.6500331, -79.391594)<br>38.00.163.58 |
| 2/9/2017 3:39:01 PM | Page 2: Exited Page | 0 minutes 29 seconds | 25 Queen St W, Toronto, ON M5V 1Z8, Canada (43.6500331, -79.391594)<br>38.00.163.58 |
| 2/9/2017 3:39:01 PM | Page 1: Entered Page | | 25 Queen St W, Toronto, ON M5V 1Z8, Canada (43.6500331, -79.391594)<br>38.00.163.58 |
| 2/9/2017 3:39:21 PM | Page 1: Textbox | Jeff Flake | 25 Queen St W, Toronto, ON M5V 1Z8, Canada (43.6500331, -79.391594)<br>38.00.163.58 |

FIG. 9C

| | | | |
|---|---|---|---|
| 2/9/2017 3:39:37 PM | Page 1: Exited Page | 0 minutes 35 seconds | 25 Queen St W, Toronto, ON M5V 1Z8, Canada *(43.6500331, -79.391594)* 38.00.163.58 |
| 2/9/2017 3:39:37 PM | Page 2: Entered Page | | 25 Queen St W, Toronto, ON M5V 1Z8, Canada *(43.6500331, -79.391594)* 38.00.163.58 |
| 2/9/2017 3:39:48 PM | Page 2: Exited Page | 0 minutes 11 seconds | 25 Queen St W, Toronto, ON M5V 1Z8, Canada *(43.6500331, -79.391594)* 38.00.163.58 |
| 2/9/2017 3:39:48 PM | Page 3: Entered Page | | 25 Queen St W, Toronto, ON M5V 1Z8, Canada *(43.6500331, -79.391594)* 38.00.163.58 |
| 2/9/2017 3:39:50 PM | Page 3: Exited Page | 0 minutes 1 seconds | 25 Queen St W, Toronto, ON M5V 1Z8, Canada *(43.6500331, -79.391594)* 38.00.163.58 |
| 2/9/2017 3:39:50 PM | Page 4: Entered Page | | 25 Queen St W, Toronto, ON M5V 1Z8, Canada *(43.6500331, -79.391594)* 38.00.163.58 |
| 2/9/2017 3:40:34 PM | Page 4: Exited Page | 0 minutes 44 seconds | 25 Queen St W, Toronto, ON M5V 1Z8, Canada *(43.6500331, -79.391594)* 38.00.163.58 |
| 2/9/2017 3:40:34 PM | Page 3: Entered Page | | 25 Queen St W, Toronto, ON M5V 1Z8, Canada *(43.6500331, -79.391594)* 38.00.163.58 |
| 2/9/2017 3:40:36 PM | Page 3: Exited Page | 0 minutes 1 seconds | 25 Queen St W, Toronto, ON M5V 1Z8, Canada *(43.6500331, -79.391594)* 38.00.163.58 |
| 2/9/2017 3:40:36 PM | Page 2: Entered Page | | 25 Queen St W, Toronto, ON M5V 1Z8, Canada *(43.6500331, -79.391594)* 38.00.163.58 |

FIG. 9D

| 2/9/2017 3:40:38 PM | Page 2: Exited Page | 0 minutes 2 seconds | 25 Queen St W, Toronto, ON M5V 1Z8, Canada (43.6500331, -79.391594) 38.00.163.58 |
|---|---|---|---|
| 2/9/2017 3:40:38 PM | Page 1: Entered Page | | 25 Queen St W, Toronto, ON M5V 1Z8, Canada (43.6500331, -79.391594) 38.00.163.58 |
| 2/9/2017 3:41:04 PM | Page 1: Annotation | ───── ← 4005 | 25 Queen St W, Toronto, ON M5V 1Z8, Canada (43.6500331, -79.391594) 38.00.163.58 |
| 2/9/2017 3:42:53 PM | Page 1: Signature | 4000a → Signed by: *[signature]* jflake@email.com From Phone (4165555951) at IP Address: 38.00.163.58 | 25 Queen St W, Toronto, ON M5V 1Z8, Canada (43.6500331, -79.391594) 38.00.163.58 |
| 2/9/2017 3:43:16 PM | File has been Saved | | 25 Queen St W, Toronto, ON M5V 1Z8, Canada (43.6500331, -79.391594) 38.00.163.58 |
| 2/9/2017 3:43:26 PM | Page 1: Exited Page | 2 minutes 47 seconds | 25 Queen St W, Toronto, ON M5V 1Z8, Canada (43.6500331, -79.391594) 38.00.163.58 |
| 2/9/2017 3:43:26 PM | Page 2: Entered Page | | 25 Queen St W, Toronto, ON M5V 1Z8, Canada (43.6500331, -79.391594) 38.00.163.58 |
| 2/9/2017 3:43:45 PM | Page 2: Signature | 4000b → Signed by: *[signature]* jflake@email.com From Phone (4165555951) at IP Address: 38.00.163.58 | 33 Adelaide St W, Toronto, ON M5H 1T1, Canada (43.6496986, -79.383321) 38.00.163.58 |
| 2/9/2017 3:44:40 PM | Page 2: Exited Page | 1 minutes 13 seconds | 33 Adelaide St W, Toronto, ON M5H 1T1, Canada (43.6496986, -79.383321) 38.00.163.58 |

FIG. 9E

| | | | |
|---|---|---|---|
| 2/9/2017<br>3:44:40 PM | Page 3:<br>Entered Page | | 33 Adelaide St W, Toronto, ON M5H 1T1,<br>Canada *(43.6496986, -79.383321)*<br>38.00.163.58 |
| 2/9/2017<br>3:44:41 PM | Page 3:<br>Exited Page | 0 minutes 1 seconds | 33 Adelaide St W, Toronto, ON M5H 1T1,<br>Canada *(43.6496986, -79.383321)*<br>38.00.163.58 |
| 2/9/2017<br>3:44:41 PM | Page 4:<br>Entered Page | | 33 Adelaide St W, Toronto, ON M5H 1T1,<br>Canada *(43.6496986, -79.383321)*<br>38.00.163.58 |
| 2/9/2017<br>3:44:50 PM | Page 4:<br>Signature | 4000c → Signed by: *[signature]*<br>jflake@email.com<br>From Phone (4165555951) at<br>IP Address: 38.00.163.58 | 33 Adelaide St W, Toronto, ON M5H 1T1,<br>Canada *(43.6496986, -79.383321)*<br>38.00.163.58 |
| 2/9/2017<br>3:45:19 PM | Page 4:<br>Image has been added | | 33 Adelaide St W, Toronto, ON M5H 1T1,<br>Canada *(43.6496986, -79.383321)*<br>38.00.163.58 |
| 2/9/2017<br>3:46:11 PM | Page 4:<br>Signature | 4000d → Signed by: *[signature]*<br>fdave@email.com.com<br>From Phone (4165557514) at<br>IP Address: 38.00.163.58 | 33 Adelaide St W, Toronto, ON M5H 1T1,<br>Canada *(43.6496986, -79.383321)*<br>38.00.163.58 |
| 2/9/2017<br>3:46:39 PM | Page 4:<br>Image has been added | | 33 Adelaide St W, Toronto, ON M5H 1T1,<br>Canada *(43.6496986, -79.383321)*<br>38.00.163.58 |
| 2/9/2017<br>3:47:38 PM | Page 4:<br>Exited Page | 2 minutes 56 seconds | 33 Adelaide St W, Toronto, ON M5H 1T1,<br>Canada *(43.6496986, -79.383321)*<br>38.00.163.58 |
| 2/9/2017<br>3:47:38 PM | Page 3:<br>Entered Page | | 33 Adelaide St W, Toronto, ON M5H 1T1,<br>Canada *(43.6496986, -79.383321)*<br>38.00.163.58 |

FIG. 9F

| | | | |
|---|---|---|---|
| 2/9/2017 3:47:40 PM | File has been Saved and Finalized | | 25 Queen St W, Toronto, ON M5V 1Z8, Canada *(43.6500331, -79.391594)*<br>38.00.163.58 |

2017 - © Syngrafii Inc. and LongPen™® are Registered Trademarks
Syngrafii Software & LongPen™ Services are protected under International Patents Granted
Unauthorized Use Prohibited

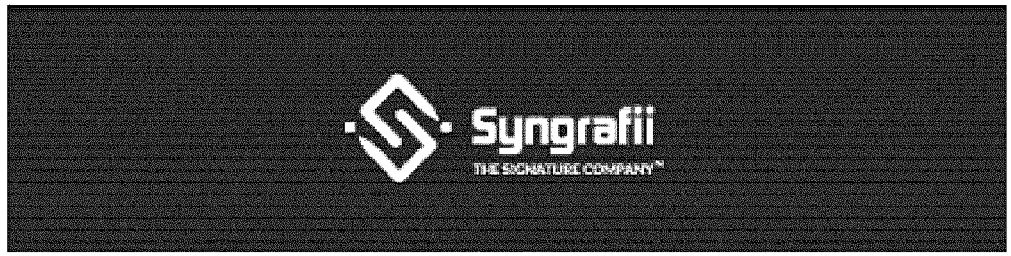

Dear Ravi Dave,

Your Live Session for documents in signing package Syngrafii Demo is ready.

Signers
- Ravi Dave
- Bob Hunter

Documents
- CAN_DMS_104065801_v1_Power of Attorney Demo SIGN — 3000a
- Loan JSmith-DPa-Form - 1-2017 SIGN — 3000b

What happens when I click on the SIGN link?

- Your document will open over a secure connection in a web page
- You can review the document on your desktop or tablet
- You can sign and initial the document by linking your smartphone
- Once you have finished, click SEND and the document will be securely stored and finalized
- You will receive an email of the original signed document along with a Syngrafii Compliance Audit Certificate™

For security reasons, this signing request will expire in 8 days.

FIG. 16

Home Equity Line of Credit
Application                        3000

FRANCISCO FINANCE

First name:                Last Name:

Your application reference
PL-962286
Quote this if you need to call us

____Joe_____        ____Smith_____

Gender: Male ✓   Female ☐

Address (Unit Number and Street name):

____Suite 2700 88 Queens Quay West_____

City:                      Province

____Toronto_____      ____Ontario_____     } 3100

Postal Code: __M5J 0B8__

Telephone: _416.555.1234_   Email: _Joe.Smith@email.com_

Loan Amount _$200,000_     Current Equity _$400,000_

Current Mortgage: _____$800,000_____

Purpose of Loan: _____A Secret_____

CurrentMor  Bank of Canada

 — 3250

Signature: _____ Date: _____

Home Equity Line of Credit Application

FRANCISCO FINANCE

Your application reference
PL-962286
Quote this if you need to call us

First name:          Last Name:

Joe                              Smith

Gender: Male ☐   Female ☐

Address (Unit Number and Street name):

Suite 2700 88 Queens Quay West

City:                                   Province

Toronto                         Ontario

Postal Code:   M5J 0B8

Telephone:  416.555.1234        Email:  Joe.Smith@email.com

Loan Amount  $200,000          Current Equity  $400,000

Current Mortgage:        $800,000

Purpose of Loan:         A Secret

CurrentMortgage Provider:   Bank of Canada

Signature:                                             Date: March 12, 2018

FIG. 18C

NOTIFICATION HISTORY

✉ Notify Signer sent by Email to Ravi Dave (rdave@email.com)   (6) ▾
💬 Security Code sent by Text Message to Ravi Dave (4161234567)   (2) ▾
💬 Mobile Link sent by Text Message to Ravi Dave (4161234567)   (3) ▾
💬 Mobile Link sent by Text Message to Bob Hunter (4161231236)   (3) ▾
✉ Executed sent by Email to Ravi Dave (rdave@email.com)   (1) ▾

MOBILE SIGNATURES —7008

✎ Ravi Dave (rdave@email.com) added signature from phone (4161234567)   ▾
✎ Ravi Dave (rdave@email.com) added signature from phone (4161234567)   ▾
✎ Bob Hunter (bhunter@email.com) added signature from phone (4161231236)   ▾

MOBILE IMAGES —7009

🖼 Ravi Dave (rdave@email.com) added image from phone (4161234567)   ▾
🖼 Bob Hunter (bhunter@email.com) added image from phone (4161231236)   ▾

SIGNING LOG —7010

✓ 👤 Ravi Dave

| Signer 1 | | Summary | | Signatures | |
|---|---|---|---|---|---|
| Name | Ravi Dave | Text Boxes | 2 | Wet Ink | 3 |
| Email | rdave@email.com | Ink Annotations | 0 | Typed | 2 |
| Mobile Number | 416-123-4567 | Images | 2 | Accepted | 0 |
| Total Signing Time | 37 minutes 10 seconds | | | Total | 5 |

FIG. 23B

| 6:49:41 PM | Page 2 | Signature Added |  —4000a | | 11.245.36.87 |

Ravi Dave (rdave@email.com)
Signature    Wet Ink
Phone        4161234567
Device       iPhone (iOS 11.0.1)
IP Address   11.245.36.87
Location     12 gold ave., Toronto, ON M6K 1N5, Canada

| | | | | |
|---|---|---|---|---|
| 6:57:13 PM | Page 2 | Exited Page | 11 minutes 12 seconds | 11.245.36.87 |
| 6:57:13 PM | Page 3 | Entered Page | | 11.245.36.87 |
| 6:57:14 PM | Page 3 | Exited Page | 0 second | 11.245.36.87 |
| 6:57:14 PM | Page 4 | Entered Page | | 11.245.36.87 |
| 6:57:18 PM | Page 4 | Signature Added |  —4000a | 11.245.36.87 |

Ravi Dave (rdave@email.com)
Signature    Wet Ink
Phone        4161234567
Device       iPhone (iOS 11.0.1)
IP Address   11.245.36.87
Location     12 gold ave., Toronto, ON M6K 1N5, Canada 6:58:45 PM  Page 4   Image Added                                                          11.245.36.87

Ravi Dave (rdave@email.com)
Device       iPhone (iOS 11.0.1)
IP Address   4161234567
Location     12 gold ave., Toronto, ON M6K 1N5, Canada

FIG. 23C

| | | | | | |
|---|---|---|---|---|---|
| 7:02:14 PM | Page 2 | Signature Added |  Ravi Dave —4000b<br>SJWPZL2KGCP7GLQR<br>Ravi Dave (rdave@email.com)<br>Signature   Typed | | 11.245.36.87 |
| 7:04:44 PM | Page 2 | Signature Added |  Ravi Dave —4000b<br>SRW5N22WEZSDGF17<br>Ravi Dave (rdave@email.com)<br>Signature   Typed | | 11.245.36.87<br><br>11.245.36.87 |
| 7:06:24 PM | Page 2 | Exited Page | 7 minutes 1 second | | 11.245.36.87 |
| 7:06:24 PM | Page 3 | Entered Page | | | 11.245.36.87 |
| 7:06:25 PM | Page 3 | Exited Page | 1 second | | 11.245.36.87 |
| 7:06:25 PM | Page 4 | Entered Page | | | 11.245.36.87 |
| 7:07:16 PM | Page 4 | Signature Added |  —4000c<br>Michael Jason (mjason@email.com)<br>Signature   Wet Ink<br>Phone       4161232116<br>Device      Samsung SGH-I317M (Android 4.4.2)<br>IP Address  11.245.36.13<br>Location    12 gold ave.,   Toronto, ON M6K 1N5, Canada | | 11.245.36.13 |
| 7:07:56 PM | Page 4 | Image Added |  | —5100 | 11.245.36.13 |
| | | | Michael Jason (mjason@email.com)<br>Phone       4161232116<br>Device      Samsung SGH-I317M (Android 4.4.2)<br>IP Address  11.245.36.13<br>Location    12 gold ave., , Toronto, ON M6K 1N5, Canada | | |
| 7:10:59 PM | Document Saved and Finalized | 37 minutes 10 seconds | | | 11.245.36.13 |

FIG. 23D

SYSTEMS AND METHODS FOR EXECUTING AND DELIVERING ELECTRONIC DOCUMENTS

CROSS-REFERENCE TO RELATED APPLICATION

The present application claims priority from U.S. Provisional Application No. 62/479,764, filed on Mar. 31, 2017, the entire content of which is herein incorporated by reference.

FIELD

This relates to the delivery of signed documents, and in particular, to systems and methods for executing documents electronically and delivering a signed document to a remote party.

BACKGROUND

The signing and execution of documents is an important part of completing many transactions. Conventionally, a physical copy of a document (e.g. a contract) is presented to and signed or executed by one or more parties to the transactions. Often, multiple parties to the transaction will meet in the same physical location to take turns signing or executing various documents. The signing of physical documents in person may provide a degree of certainty to a transaction, as the identity of the signing parties can be readily verified. However, the coordination of such meetings can be cumbersome, particularly when parties to a transaction are located a great distance from one another. For example, it is difficult for a party in Greenland to coordinate a meeting with a party in Australia in which both are physically present. Moreover, many situations require the signatures of more than two parties (for example, agreements requiring the signatures of each member of a Board of Directors of a corporation).

Moreover, once an agreement has been signed by parties, multiple copies of the document may exist (for the records of each party). In some cases, an agreement is intended to be confidential. As such, the storage of a physical copy or multiple physical copies of an agreement can pose a security risk, as the mishandling of a physical document can result in advertent revealing of the contents of the document. A common situation is one in which photocopies are made of a document, and a copy is inadvertently left behind in the photocopy room for anyone to discover. It would be desirable to improve the security associated with storing executed agreements.

The signing of documents electronically is increasing in popularity, and reduces the physical constraints associated with executing agreements. However, there are limitations associated with signing documents electronically. For example, there is a much greater risk of fraud in that a party signing a document electrically may be an imposter, or that a party can allege the existence of a circumstance which may serve to repudiate an agreement after the fact. The security and reliability of an execution carried out electronically is of paramount importance.

Repudiation refers to a party's denial of assent to a particular agreement or transaction. Previously, parties provided signatures written in ink on a physical piece of paper in order to evidence their assent to the agreement. A "wet ink" signature generally gives rise to a presumption of assent for that signing party. However, if a party to a transaction or agreement denies having given assent, other evidence is sometimes required. For example, a forensic handwriting analysis may analyze the handwriting on the paper document and confirm that the signature was or was not given by a particular party. The handwriting analyst may consider issues such as the pressure differential in a pen stroke, the direction of writing, dimensions of loops in certain characters, as well as other factors.

When signing electronic documents, traditional methods may be deficient in providing information which can be used as evidence to resist repudiation of a contract. For example, a photocopy of a signature may be more difficult for a handwriting analyst to analyze. Moreover, a signature made using a pointing device (e.g. a mouse) may not reflect the same nuances and individual characteristics that can be gleaned from an individual's handwriting.

Moreover, although the signing of documents using an electronic signature (referred to herein as an "eSignature") may be sufficient for completing certain transactions and/or agreements, electronic signatures alone may not be sufficient for the purposes of resisting attempts to repudiate an agreement after the fact. Often, compliance departments of sophisticated corporations require a physical copy of a "wet ink" signature of a signing party. Supplying a physical "wet ink" signature may require the expenditure of numerous resources in order to deliver such a document. For example, a signed document can be couriered to another party, but this would require a significant expenditure of energy and expense in order to carry out. Moreover, the delivery of such a document would in some cases be impossible to deliver quickly, for example on the same day as execution (e.g. if a signing party is on the other side of the world).

It would be desirable to develop a system for executing or signing documents electronically while alleviating some or all of the aforementioned challenges.

SUMMARY

In accordance with one aspect, there is provided a computer-implemented method for annotating or signing an electronic document. The method may include: receiving or retrieving an electronic document available for annotation or execution by one or more parties; transmitting the electronic document for display on a first computing device to the first computing device at a first location; authenticating an identity of a first user of the first computing device; receiving electronic signals representing an user input of the first user from the first computing device; generating digital data representative of an indicia based the user input of the first user from the first computing device; and applying the digital data to the electronic document to form a first annotation or signature from the first user.

In another aspect, the method may include: receiving, from the first computing device, electronic signals representing an additional user input of the first user; generating digital data representative of a second indicia based the additional user input of the first user from the first computing device; applying the digital data to a digital compliance audit certificate associated with the electronic document to form a second annotation or signature from the first user; and storing the digital compliance audit certificate on a database.

In another aspect, the method may include: receiving, from the first computing device, electronic signals representing a signature of a person different from the first user; and applying the signature of the person different from the first user on the digital compliance audit certificate associated with the electronic document.

In yet another aspect, the method may include: retrieving the digital compliance audit certificate from the database; and producing a physical copy of the digital compliance audit certificate using a printing device configured to reproduce biomechanically accurate handwriting on a physical medium, wherein the physical copy of the digital compliance audit certificate includes a biomechanically accurate wet ink signature of the first user based on the first annotation or signature from the first user.

In yet another aspect, the method may include: concurrently with transmitting the electronic document for display on the first computing device to the first computing device, transmitting the electronic document for display on a second computing device to the second computing device at a second location; authenticating an identity of a second user of the second computing device; receiving electronic signals representing an user input of the second user from the second computing device; generating digital data representative of an indicia based the user input of the second user from the second computing device; and applying the digital data to the electronic document to form a first annotation or signature from the second user.

In another aspect, the method may include: after the step of applying the digital data to the electronic document to form the first annotation or signature from the first user: transmitting the annotated or signed electronic document for display on a second computing device to the second computing device at a second location; authenticating an identity of a second user of the second computing device; receiving electronic signals representing an user input of the second user from the second computing device; generating digital data representative of an indicia based the user input of the second user from the second computing device; and applying the digital data to the electronic document to form a first annotation or signature from the second user.

In one aspect, authenticating the identity of the first user may include verifying at least one of: a personal identification number (PIN), a security code, a password, a photo of the first user, biometric information of the first user, and a device ID.

In one aspect, the biometric information may include at least one of: a fingerprint, a facial scan, an iris pattern, a retina pattern, a voice recording, and a handwritten signature.

In another aspect, the digital compliance audit certificate may include at least one of: identity authentication results, handwriting data, GPS location data, MAC address, IP addresses, hardware information relating to the first computing device, audio communication stream, visual communication stream, browsing information, and a time duration of displaying the electronic document at the first computing device.

In yet another aspect, producing a physical copy of the digital compliance audit certificate may include using a handwriting implement to apply pressure to physical medium according to at least two of points of pressure, thickness of lines, and cadence of the handwriting of the first user.

In another aspect, the user input of the first user may include a handwriting of the user and the generated indicia based the user input comprises the handwriting of the user.

In one aspect, the handwriting of the user is received by the first computing device through an input device comprising one of: a finger via a touchscreen, a mouse, and a stylus.

In another aspect, applying the generated indicia to the electronic document may include applying the handwriting through the input device configured to measure at least two of: points of pressure, thickness of lines, and cadence of handwriting of the first user.

In another aspect, the method may include: authenticating the handwriting of the user based on a stored handwriting profile of the user, and only generating the digital data representative of the indicia if and when the handwriting of the user is determined to be generated by the user at the first computing device.

In another aspect, the user input of the first user may include a typed string, and the generated indicia based the typed string may include: an unique visual icon, a hash code, or both.

In one aspect, the typed string is a typed name or initial.

In another aspect, the unique visual icon or the hash code is generated based on one or more of: a length of the typed string, a font of the typed string, a timestamp of the typed string, an IP address associated with the first computing device, a MAC address of the first computing device, and hardware information of the first computing device.

In yet another aspect, collecting an audio or visual feed of the first user at the first computing device and storing the audio or visual feed in a database.

In one aspect, the electronic document represents a contract or a transaction between the one or more parties.

In another aspect, the method may include transmitting a link to the electronic document to the first user via a message, an e-mail, or a mobile text message.

In yet another aspect, transmitting the electronic document to the second user includes transmitting link to the electronic document to the second user via a message, an e-mail, or a mobile text message.

In yet another aspect, the digital compliance audit certificate includes a first QR code.

In one aspect, the method may include providing access to an executed version of the electronic document based on the first QR code, the executed version of the electronic document including at least the first annotation or signature from the first user.

In another aspect, the second annotation or signature on the digital compliance audit certificate may include a corresponding QR code, wherein scanning the corresponding QR code retrieves data associated with the first annotation or signature from the first user.

In yet another aspect, the method may include generating a master file for the electronic document, the master file comprising at least a pressure profile of the first annotation or signature based on the user input of the first user, the pressure profile being unique and corresponding to the digital data representative of the indicia.

In one aspect, the pressure profile may include at least one of: cadence, speed, timestamp, date stamp, x-y coordinates of the first annotation or signature, byte count of the first annotation or signature, a device ID, and device information of the first computing device.

In another aspect, when the user input includes a digital handwriting of the user received by the first computing device through an input device configured to capture pressure information of the digital handwriting, the pressure profile includes data representative of the pressure information of the digital handwriting of the first user.

In another aspect, the method may include: assigning or retrieving an address of the electronic document on a blockchain; authenticating the first user as a valid party to the electronic document before applying the digital data to the electronic document to form the first annotation or signature from the first user; encrypting and storing an edited version of the electronic document including the first annotation or signature in a block on the blockchain; and assigning or retrieving an address of the block storing the edited version of the electronic document.

In another aspect, the block storing the edited version of the electronic document may include: one or more of: a user identity, a timestamp associated with the first annotation or signature, the first annotation or signature, a digital compliance audit certificate, and a pressure profile.

In accordance with one aspect, there is provided a computer system for annotating or signing an electronic document, the computer system includes: a processor; and a non-transitory computer-readable memory device storing machine-readable instructions; wherein the processor is configured to, when executing the machine-readable instructions, perform the steps of: receiving or retrieving an electronic document available for annotation or execution by one or more parties; transmitting the electronic document for display on a first computing device to the first computing device at a first location; authenticating an identity of a first user of the first computing device; receiving electronic signals representing an user input of the first user from the first computing device; generating digital data representative of an indicia based the user input of the first user from the first computing device; and applying the digital data to the electronic document to form a first annotation or signature from the first user.

In another aspect, the processor may be configured to perform: receiving, from the first computing device, electronic signals representing an additional user input of the first user; generating digital data representative of a second indicia based the additional user input of the first user from the first computing device; applying the digital data to a digital compliance audit certificate associated with the electronic document to form a second annotation or signature from the first user; and storing the digital compliance audit certificate on a database.

In yet another aspect, the processor may be configured to perform: receiving, from the first computing device, electronic signals representing a signature of a person different from the first user; and applying the signature of the person different from the first user on the digital compliance audit certificate associated with the electronic document.

In one aspect, the processor may be configured to perform: retrieving the digital compliance audit certificate from the database; and producing a physical copy of the digital compliance audit certificate using a printing device configured to reproduce biomechanically accurate handwriting on a physical medium, wherein the physical copy of the digital compliance audit certificate includes a biomechanically accurate wet ink signature of the first user based on the first annotation or signature from the first user.

In another aspect, the processor may be configured to perform: concurrently with transmitting the electronic document for display on the first computing device to the first computing device, transmitting the electronic document for display on a second computing device to the second computing device at a second location; authenticating an identity of a second user of the second computing device; receiving electronic signals representing an user input of the second user from the second computing device; generating digital data representative of an indicia based the user input of the second user from the second computing device; and applying the digital data to the electronic document to form a first annotation or signature from the second user.

In yet another aspect, the processor may be configured to perform, after the step of applying the digital data to the electronic document to form the first annotation or signature from the first user: transmitting the annotated or signed electronic document for display on a second computing device to the second computing device at a second location; authenticating an identity of a second user of the second computing device; receiving electronic signals representing an user input of the second user from the second computing device; generating digital data representative of an indicia based the user input of the second user from the second computing device; and applying the digital data to the electronic document to form a first annotation or signature from the second user.

In one aspect, authenticating the identity of the first user may include verifying at least one of: a personal identification number (PIN), a security code, a password, a photo of the first user, biometric information of the first user, and a device ID.

In another aspect, the biometric information may include at least one of: a fingerprint, a facial scan, an iris pattern, a retina pattern, a voice recording, and a handwritten signature.

In yet another aspect, the digital compliance audit certificate may include at least one of: identity authentication results, handwriting data, GPS location data, MAC address, IP addresses, hardware information relating to the first computing device, audio communication stream, visual communication stream, browsing information, and a time duration of displaying the electronic document at the first computing device.

In one aspect, the system may include a handwriting implement configured to apply pressure to physical medium according to at least two of points of pressure, thickness of lines, and cadence of the handwriting of the first user.

In another aspect, the user input of the first user may include a handwriting of the user and the generated indicia based the user input comprises the handwriting of the user.

In one aspect, the handwriting of the user is received by the first computing device through an input device comprising one of: a finger via a touchscreen, a mouse, and a stylus.

In another aspect, applying the generated indicia to the electronic document may include applying the handwriting through the input device configured to measure at least two of: points of pressure, thickness of lines, and cadence of handwriting of the first user.

In yet another aspect, the user input of the first user comprises a typed string, and the generated indicia based the typed string comprises: an unique visual icon, a hash code, or both.

In one aspect, the typed string is a typed name or initial.

In another aspect, the unique visual icon or the hash code is generated based on one or more of: a length of the typed string, a font of the typed string, a timestamp of the typed string, an IP address associated with the first computing device, a MAC address of the first computing device, and hardware information of the first computing device.

In yet another aspect, the processor may be configured to transmit a link to the electronic document to the first user via a message, an e-mail, or a mobile text message.

In one aspect, the digital compliance audit certificate includes a first QR code and the processor is configured to provide access an executed version of the electronic document based on the first QR code, the executed version of the electronic document comprising at least the first annotation or signature from the first user.

In another aspect, the processor is configured to generate a master file for the electronic document, the master file comprising at least a pressure profile of the first annotation or signature based on the user input of the first user, the pressure profile being unique and corresponding to the digital data representative of the indicia.

In yet another aspect, the pressure profile may include at least one of: cadence, speed, time stamp, date stamp, x-y coordinates of the first annotation or signature, byte count of the first annotation or signature, a device ID, and device information of the first computing device.

In one aspect, when the user input may include a digital handwriting of the user received by the first computing device through an input device configured to capture pressure information of the digital handwriting, the pressure profile comprises data representative of the pressure information of the digital handwriting of the first user.

In one aspect, there is provided a computer-implemented method for annotating or signing an electronic document, the method may include: receiving or retrieving an electronic document available for annotation or execution by one or more parties; receiving, from a first computing device at a first location, electronic signals representing a command to transmit the electronic document to a second computing device at a second location; transmitting the electronic document for display on the second computing device to the second computing device in response to the command; authenticating an identity of a user of the second computing device; receiving, from the first computing device, electronic signals representing a command to request to annotate or sign the electronic document by the user of the second computing device, the command comprising digital data regarding an area for annotation or signature within the electronic document; transmitting the digital data regarding the area for annotation or signature to the second computing device, so that the second computing device is operable to display the area for annotation or signature within the electronic document to the user; receiving, and transmitting to the first computing device, electronic signals representing an user input of the user from the second computing device; receiving, from the first computing device, electronic signals representing a command to annotate or sign the electronic document by the user of the second computing device; in response to the command to annotate or sign the electronic document, generating digital data representative of an indicia based the user input of the user from the second computing device; and applying the digital data to the electronic document to form an annotation or signature from the user.

In another aspect, the method may include transmitting the electronic document for display on the first computing device to the first computing device.

In yet another aspect, the method may further include: receiving, from the second computing device, electronic signals representing an additional user input of the user; generating digital data representative of a second indicia based the additional user input of the user from the second computing device; applying the digital data to a digital compliance audit certificate associated with the electronic document to form a second annotation or signature from the user; and storing the digital compliance audit certificate on a database.

In one aspect, the method may include: receiving, from the second computing device, electronic signals representing a signature of a person different from the user; and applying the signature of the person different from the user on the digital compliance audit certificate associated with the electronic document.

In another aspect, authenticating the identity of the user may include verifying at least one of: a personal identification number (PIN), a security code, a password, a photo of the user, biometric information of the user, and a device ID.

In yet another aspect, the biometric information may include at least one of: a fingerprint, a facial scan, an iris pattern, a retina pattern, a voice recording, and a handwritten signature.

In one aspect, the digital compliance audit certificate may include at least one of: identity authentication results, handwriting data, GPS location data, MAC address, IP addresses, hardware information relating to the first or second computing device, audio communication stream, visual communication stream, browsing information, and a time duration of displaying the electronic document at the first or second computing device.

In yet another aspect, the method may include: assigning or retrieving an address of the electronic document on a blockchain; authenticating the user as a valid party to the electronic document before applying the digital data to the electronic document to form the annotation or signature from the user; encrypting and storing an edited version of the electronic document including the annotation or signature in a block on the blockchain; and assigning or retrieving an address of the block storing the edited version of the electronic document.

In one aspect, the block storing the edited version of the electronic document may include one or more of: a user identity, a timestamp associated with the annotation or signature, the annotation or signature, a digital compliance audit certificate, and a pressure profile.

In another aspect, the user input of the user includes a handwriting of the user and the generated indicia based the user input comprises the handwriting of the user.

In yet another aspect, the handwriting of the user is received by the second computing device through an input device comprising one of: a finger via a touchscreen, a mouse, and a stylus.

In one aspect, applying the generated indicia to the electronic document may include applying the handwriting through the input device configured to measure at least two of: points of pressure, thickness of lines, and cadence of handwriting of the user.

In yet another aspect, the user input of the user comprises a typed string, and the generated indicia based the typed string comprises: an unique visual icon, a hash code, or both.

In another aspect, the typed string is a typed name or initial.

In one aspect, the unique visual icon or the hash code is generated based on one or more of: a length of the typed string, a font of the typed string, a timestamp of the typed string, an IP address associated with the second computing device, a MAC address of the second computing device, and hardware information of the second computing device.

In another aspect, the digital compliance audit certificate includes a first QR code.

In yet another aspect, the method may include providing access to an executed version of the electronic document based on the first QR code, the executed version of the electronic document comprising at least the annotation or signature from the user.

In one aspect, the second annotation or signature on the digital compliance audit certificate includes a corresponding QR code, wherein scanning the corresponding QR code retrieves data associated with the first annotation or signature from the user.

In another aspect, the method may include generating a master file for the electronic document, the master file including at least a pressure profile of the annotation or signature based on the user input, the pressure profile being unique and corresponding to the digital data representative of the indicia.

In another aspect, the pressure profile may include at least one of: cadence, speed, timestamp, date stamp, x-y coordinates of the first annotation or signature, byte count of the annotation or signature, a device ID, and device information of the second computing device.

In accordance with one aspect, there is provided a computer system for annotating or signing an electronic document, the system may include: a processor; and a non-transitory computer-readable memory storing machine-readable instructions, wherein the processor is configured to, when executing the machine-readable instructions, perform the following steps: receiving or retrieving an electronic document available for annotation or execution by one or more parties; receiving, from a first computing device at a first location, electronic signals representing a command to transmit the electronic document to a second computing device at a second location; transmitting the electronic document for display on the second computing device to the second computing device in response to the command; authenticating an identity of a user of the second computing device; receiving, from the first computing device, electronic signals representing a command to request to annotate or sign the electronic document by the user of the second computing device, the command comprising digital data regarding an area for annotation or signature within the electronic document; transmitting the digital data regarding the area for annotation or signature to the second computing device, so that the second computing device is operable to display the area for annotation or signature within the electronic document to the user; receiving, and transmitting to the first computing device, electronic signals representing an user input of the user from the second computing device; receiving, from the first computing device, electronic signals representing a command to annotate or sign the electronic document by the user of the second computing device; in response to the command to annotate or sign the electronic document, generating digital data representative of an indicia based the user input of the user from the second computing device; and applying the digital data to the electronic document to form an annotation or signature from the user.

In another aspect, the processor may be configured to perform: receiving, from the second computing device, electronic signals representing an additional user input of the user; generating digital data representative of a second indicia based the additional user input of the user from the second computing device; applying the digital data to a digital compliance audit certificate associated with the electronic document to form a second annotation or signature from the user; and storing the digital compliance audit certificate on a database.

In yet another aspect, the processor may be configured to perform: receiving, from the second computing device, electronic signals representing a signature of a person different from the user; and applying the signature of the person different from the user on the digital compliance audit certificate associated with the electronic document.

In one aspect, authenticating the identity of the user may include verifying at least one of: a personal identification number (PIN), a security code, a password, a photo of the user, biometric information of the user, and a device ID.

In another aspect, the biometric information includes at least one of: a fingerprint, a facial scan, an iris pattern, a retina pattern, a voice recording, and a handwritten signature.

In yet another aspect, the digital compliance audit certificate includes at least one of: identity authentication results, handwriting data, GPS location data, MAC address, IP addresses, hardware information relating to the first or second computing device, audio communication stream, visual communication stream, browsing information, and a time duration of displaying the electronic document at the first or second computing device.

In still another aspect, the user input of the user includes a handwriting of the user and the generated indicia based the user input comprises the handwriting of the user.

In one aspect, the handwriting of the user is received by the second computing device through an input device comprising one of: a finger via a touchscreen, a mouse, and a stylus.

In another aspect, applying the generated indicia to the electronic document includes applying the handwriting through the input device configured to measure at least two of: points of pressure, thickness of lines, and cadence of handwriting of the user.

In yet another aspect, the user input of the user includes a typed string, and the generated indicia based the typed string comprises: an unique visual icon, a hash code, or both.

In one aspect, the unique visual icon or the hash code is generated based on one or more of: a length of the typed string, a font of the typed string, a timestamp of the typed string, an IP address associated with the second computing device, a MAC address of the second computing device, and hardware information of the second computing device.

In another aspect, the processor may be configured to provide access to an executed version of the electronic document based on an QR code within the digital compliance audit certificate, the executed version of the electronic document comprising at least the annotation or signature from the user.

In yet another aspect, the processor may be configured to generate a master file for the electronic document, the master file comprising at least a pressure profile of the annotation or signature based on the user input, the pressure profile being unique and corresponding to the digital data representative of the indicia.

In still another aspect, the pressure profile comprises at least one of: cadence, speed, timestamp, date stamp, x-y coordinates of the first annotation or signature, byte count of the annotation or signature, a device ID, and device information of the second computing device.

In one aspect, the processor may be configured to: assign or retrieve an address of the electronic document on a blockchain; authenticate the user as a valid party to the electronic document before applying the digital data to the electronic document to form the annotation or signature from the user; encrypt and store an edited version of the electronic document including the annotation or signature in a block on the blockchain; and assign or retrieve an address of the block storing the edited version of the electronic document.

In accordance with one aspect, there is provided a method for delivering a signed document, the method comprising: displaying an electronic document on a display of a first computing device in a first location; confirming an identity of the first user, executing/annotating the electronic document on the first computing device, wherein executing/annotating the electronic document comprises applying handwriting of the first user to the electronic document, and further comprises applying handwriting of the first user to an electronic compliance certificate; storing the electronic compliance certificate in a database; transmitting the executed electronic document to a second user; retrieving the electronic compliance certificate from the database; producing a physical copy of the electronic compliance certificate using a printing device configured to reproduce biomechanically accurate handwriting on a physical medium, wherein the physical copy of the electronic compliance certificate includes a biomechanically accurate signature of the first user; and delivering the physical copy of the electronic compliance certificate to the second user.

In some embodiments, retrieving the electronic compliance certificate is performed by a third party, and wherein the third party is located proximal to the second user.

In some embodiments, the third party is located in a same city as the second user.

In some embodiments, the database is remote from the first location.

In some embodiments, confirming the identity of the first user comprises at least one of accepting a personal identification number (PIN) login, a password, a photo of the first user, and/or one or more biometric inputs from the first user.

In some embodiments, the electronic compliance certificate further comprises at least one of: identity verification results, handwriting data, location data, MAC and/or IP addresses, hardware information relating to the first computing device, audio and/or visual communication streams, browsing information, and a time duration of a viewing session.

In some embodiments, the location data comprises GPS location data.

In some embodiments, producing a physical copy of the electronic compliance certificate comprises using a handwriting implement to apply pressure to physical medium according to at least two of points of pressure, thickness of lines, and cadence of the handwriting of the first user.

In some embodiments, delivering the physical copy of the electronic compliance certificate comprises a third party delivering the physical copy of the electronic compliance certificate to the second user.

In some embodiments, applying the handwriting to the electronic document includes applying the handwriting through an input device configured to measure at least two of points of pressure, thickness of lines, and cadence of handwriting of the first user.

In some embodiments, the second user is located in a second location remote from the first location.

In some embodiments, the method as described herein further comprises collecting an audio/visual feed of the first user and transmitting the audio/visual feed of the first user to the second user.

In some embodiments, the electronic document represents a transaction between the first user and the second user.

In some embodiments, transmitting the executed electronic document to the second user comprises transmitting a secure email message to the second user.

In some embodiments, the executed electronic document is transmitted to the user upon execution by the first user.

In some embodiments, the electronic compliance certificate includes a first QR code.

In some embodiments, the method as described herein further comprises accessing the executed electronic document based on the first QR code and using QR code server authentication.

In some embodiments, the electronic compliance certificate includes signatures of each signing party to the electronic document.

In some embodiments, each signature on the electronic compliance certificate includes a corresponding QR code, wherein scanning a respective QR code retrieves handwriting data associated with the respective signature.

In some embodiments, delivering the physical copy comprises delivering the physical copy on a same date as a date of execution of the electronic document.

In some embodiments, transmitting the executed electronic document comprises transmitting the executed electronic document and the electronic compliance certificate.

In some embodiments, applying handwriting of the first user to the electronic document comprises the first user inputting a signature into the electronic document.

In some embodiments, applying handwriting of the first user to an electronic compliance certificate comprises the first user inputting a signature into the electronic document.

In some embodiments, applying handwriting of the first user to the electronic document comprises the first user inputting an instruction to retrieve a stored signature.

BRIEF DESCRIPTION OF THE DRAWINGS

In the figures, which depict example embodiments:

FIGS. 9A-9G illustrate the contents of an example embodiments of a master audit file;

FIGS. 12, 13 and 14 illustrate various example user interfaces of a system platform for remote signing of a document, according to some embodiments;

FIG. 16 illustrates an example user interface for a live signing session of a document, according to some embodiments;

FIGS. 18A, 18B and 18C illustrate example interfaces for signing or annotating a document, according to some embodiments;

FIGS. 23A, 23B, 23C and 23D illustrate various parts of a master file, according to some embodiments.

Figure 1:
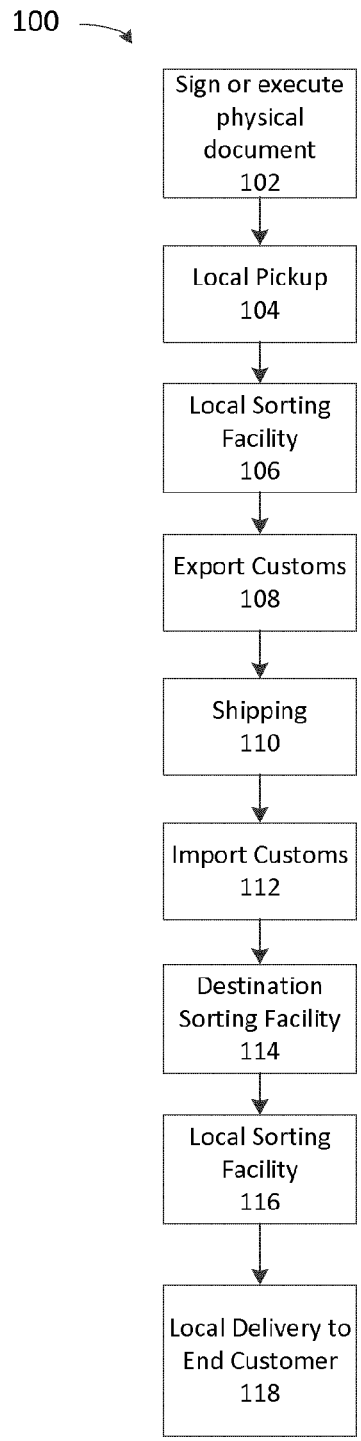
FIG. 1 is a flow diagram of an example process for delivering a hard copy of a document with a signature, according to some embodiments.

The drawings, described below, are provided for purposes of illustration, and not of limitation, of the aspects and features of various examples of embodiments described herein. The drawings are not intended to limit the scope of the teachings in any way. For simplicity and clarity of illustration, elements shown in the figures have not necessarily been drawn to scale. The dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various example embodiments described herein.

The embodiments of the systems and methods described herein may be implemented in hardware or software, or a combination of both. However, these embodiments may be implemented in computer programs executing on programmable computers, each computer including at least one processor, a data storage system (including volatile and non-volatile memory and/or storage elements), and at least one communication interface. For example, the programmable computers may be a server, network appliance, set-top box, embedded device, computer expansion module, personal computer, laptop, personal data assistant, cloud computing system or mobile device. A cloud computing system is operable to deliver computing service through shared resources, software and data over a network. Program code is applied to input data to perform the functions described herein and to generate output information. The output information is applied to one or more output devices to generate a discernible effect. In some embodiments, the communication interface may be a network communication interface. In embodiments in which elements are combined, the communication interface may be a software communication interface, such as those for inter-process communication. In still other embodiments, there may be a combination of communication interfaces.

Each program may be implemented in a high level procedural or object oriented programming or scripting language, or both, to communicate with a computer system. However, alternatively the programs may be implemented in assembly or machine language, if desired. In any case, the language may be a compiled or interpreted language. Each such computer program may be stored on a storage media or a device (e.g. ROM or magnetic diskette), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product including a physical non-transitory computer readable medium that bears computer readable and computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

FIG. 1 is a flow diagram of an example process for delivering an original physical version of a document with a signature, according to some embodiments. At 102, a physical document or agreement is signed, executed and/or annotated by a signing party in a first geographic area. The physical document may be signed by one or more parties using a signing implement (e.g. a pen or other writing implement). The physical document may represent an agreement or transaction between one or more parties.

At 104, the physical document is collected locally by a delivery service (e.g. a courier). The courier transports the physical document to a local sorting facility in the first geographic area. At 106, the local sorting facility catalogues the physical document and arranges for transportation. In this example, the physical document is being shipped internationally, although it is contemplated herein that documents may be shipped domestically as well.

At 108, the physical document must clear export customs prior to shipping. This can be a time-consuming process. Moreover, in many of the above-noted steps, it is possible for the physical document to be misplaced, or even lost altogether, which further delays the process. At 110, the document is shipped, for example by land (e.g. a truck), sea (e.g. a shipping vessel), or air (e.g. a cargo airplane). The process of shipping uses fuel and can be quite resource-intensive depending on the distances involved.

At 112, the physical document arrives at the destination country and must again clear import customs. This process takes time. Moreover, once customs have been cleared, the document will at 114 be received by a destination sorting facility. At 116, the document is transported to a local sorting facility for eventual delivery. At 118, the physical document is delivered to the intended recipient.

The above-noted process for sending a signed physical document is cumbersome and uses excessive manpower. Fuel resources, equipment depreciation costs, maintenance expense, customs delays, and vehicles that could otherwise be used to ship other goods are all put to use simply to obtain a physical document with a "wet ink" signature.

Figure 2:
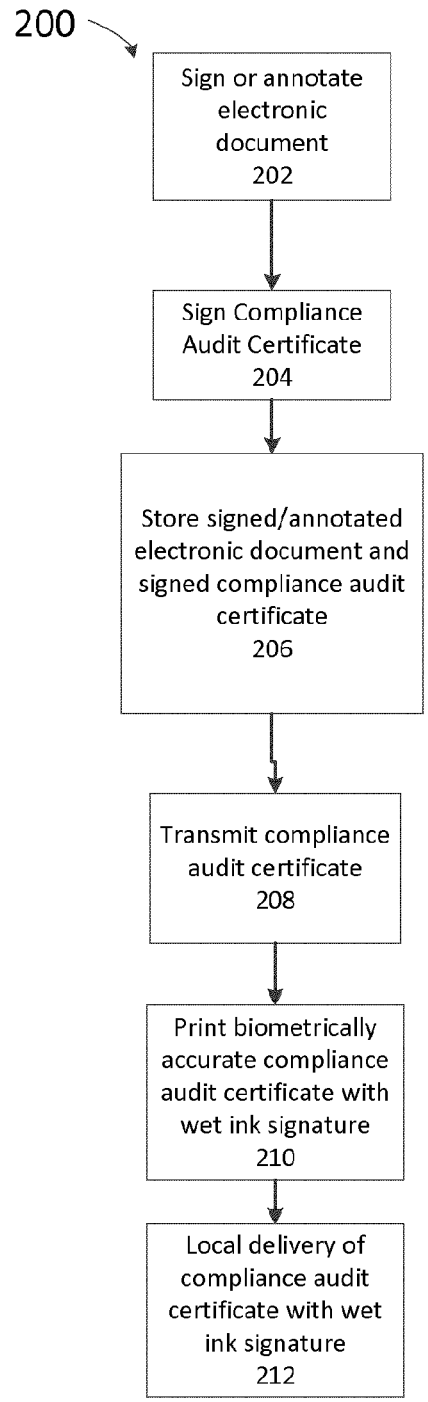
FIG. 2 is a flow diagram of an example process for signing and delivering an electronically signed document, according to some embodiments.

FIG. 2 is a flow diagram of an example process for signing and delivering an electronically signed document, according to some embodiments. At 202, an electronic document is presented and then signed, annotated and/or executed by one or more signing parties electronically. Throughout the signing process, many actions taken by individual participants are noted and stored in a transactional audit file. Many different embodiments and options are contemplated and described below as to how the electronic document is presented to the one or more signing parties, and the surrounding functionality for providing signatures/annotations, as well as the recording of the surrounding circumstances at the time of signing.

At 204, an additional signature from one or more of the signing parties is provided on a compliance audit certificate for the purposes of compliance. Additional supporting documentation may also be included with the compliance audit certificate, as described further below.

At 206, the electronically signed document and the compliance audit certificate are saved and stored in a database. In some embodiments, access to the database is controlled by one or more of the signing parties, or by an intermediary that is not one of the signing parties. Although the term database is used herein, the electronically signed documents can be stored in any suitable computer-readable storage medium.

At 208, as an optional step, the compliance audit certificate is transmitted. The electronic compliance audit certificate (CAC) may be transmitted to a third party (e.g. a courier or delivery service). The CAC may also be sent to one of the signing parties. In some embodiments, the CAC is transmitted to a delivery service which is located within the vicinity of one or more of the signing parties to the electronic document. For example, if signing parties are located in Melbourne, Australia, Copenhagen, Denmark, and Dubai, UAE, the CAC may be sent to delivery services located in Melbourne, Copenhagen and Dubai. In some embodiments, the CAC is sent to the branch of the delivery service which is closest to the physical location of the intended recipient. For example, the CAC may be sent to the local sorting facility of the delivery service closest to the signing party located in Melbourne.

In some embodiments, the CAC is transmitted to a recipient immediately upon execution of the CAC. In some embodiments, the CAC is stored and is not transmitted until a later point in time (for example, if requested by a signing party). The CAC may be sent via email, text message, or any suitable communication method for transmitting electronic signals. In some embodiments, the transmission of the CAC uses secure communication protocols and/or encryption techniques.

At 210, the recipient (in this example, a delivery service) then prints the CAC, together with at least one biometrically and biomechanically accurate signature present on the printed CAC. In some embodiments, the signature is printed by a printing device which is operable to emulate and output biometrically and biomechanically accurate signatures. An example of such a device is the LongPen printing tool as described in U.S. patent application Ser. No. 14/469,951, the contents of which are hereby incorporated by reference in their entirety. Upon printing the physical CAC with one or more biometrically and biomechanically accurate signatures, at 212 the physical CAC is then delivered to the intended recipient. In some embodiments, the physical CAC with signatures may be optionally delivered to the intended recipient on the same day that the electronic document and CAC are executed, signed and/or annotated.

Throughout the disclosure, the term "wet ink" (e.g. a wet ink signature) may refer to a signature or annotation that is: 1) created when a person physically marks a document with an ink pen; 2) generated when a person makes handwriting marks on an electronic document with a stylus, a fingertip, or another writing implement through a device that is capable of capturing the person's handwriting characteristics and parameters (e.g. one or more of coordinates, pressure, acceleration, cadence, speed, and rhythm); 3) digitally generated when a person enters user input to create or accept a digital signature through a system described herein; or 4) printed when a special printing apparatus (e.g. LongPen™) prints a digitally-captured handwriting or a scanned handwriting on a piece of paper. The wet ink signature or annotation may be present on a physical medium (e.g. a piece of paper) or stored digitally in a memory device. In all cases, a wet ink signature or annotation is an original, legally defensible signature or annotation that is a biometrically and biomechanically accurate representation of the original handwriting. The wet ink signature or annotation can be forensically verified by an forensic examiner or expert as belonging to the person who signed or made the annotation.

Throughout the disclosure, the term "signature" may refer to signature, annotation, notes and/or any handwriting marks, or a combination thereof.

As can be readily appreciated, the above-noted process 200 described in relation to FIG. 2 provides a number of advantages in relation to the process 100 described in FIG. 1. As noted above, the process 200 offers a far less labour intensive process for delivering signature-signed documents to a recipient, at virtually any location in the world which offers local delivery service, possibly on the same day as execution of the document.

Moreover, it should be noted that in some embodiments, the compliance audit certificate is sent to the recipient with biometrically and biomechanically accurate signatures, rather than the document or agreement itself which was also signed by the signing parties. This enhances privacy, as the electronic document can be signed electronically without needing to be fully printed. Thus, the chance of a physical copy of a confidential document being misplaced is much lower (or almost impossible, in cases where no physical document is printed). Moreover, the physical compliance audit certificate contains binding the original biometrically and biomechanically accurate signatures which may confirm the legality of the corresponding electronic agreement signed by the signing parties.

Embodiments described herein may eliminate or reduce the need for many of the costs and delays associated with the process 100 described in FIG. 1. For example, the following may be reduced or eliminated: the cost of the initial pick-up of the physical document, the cost of initial document sorting, the potential delays incurred at customs prior to shipping, the expense and delay of long-haul transportation of the physical document, and the need for call-centre tracking support infrastructure. Moreover, the capacity for a delivery service to deliver additional files would be increased, and greenhouse gas emissions would be greatly reduced compared to the supply chain process of delivering a physical document from an originating location to a recipient location.

According to some embodiments, systems and methods described herein may provide the ability for one or more parties to annotate and apply a legally binding signature into an electronic (e.g. digital) document (e.g. Microsoft Word, PDF documents, and the like) using a mobile computing device, tablet or computer, and have a digitally-signed compliance audit certificate physically delivered, with an original, legally defensible, wet-ink signature (e.g. biometrically and biomechanically accurate), to any other point on earth. The systems and methods described herein may be implemented in a variety of ways. More particularly, a format may be selected for the electronic document, such as Microsoft Word, PDF, open source writing formats, or other formats operable to receive annotations. The systems and methods described herein may also be implemented in part as a plug-in to a commercial digital editing computer program (e.g. Adobe Acrobat, Microsoft Word, or the like).

Some embodiments of the present invention may perform digital handwriting authentication, digital document management, and media conferencing that may be operable to record a plurality of characteristics of an individual's handwriting, a plurality of handwriting movements, a base document or image, a media stream, and other data for the purposes of providing a secure authentication method that may reduce the likelihood of repudiation of a contract or agreement.

Figure 3:
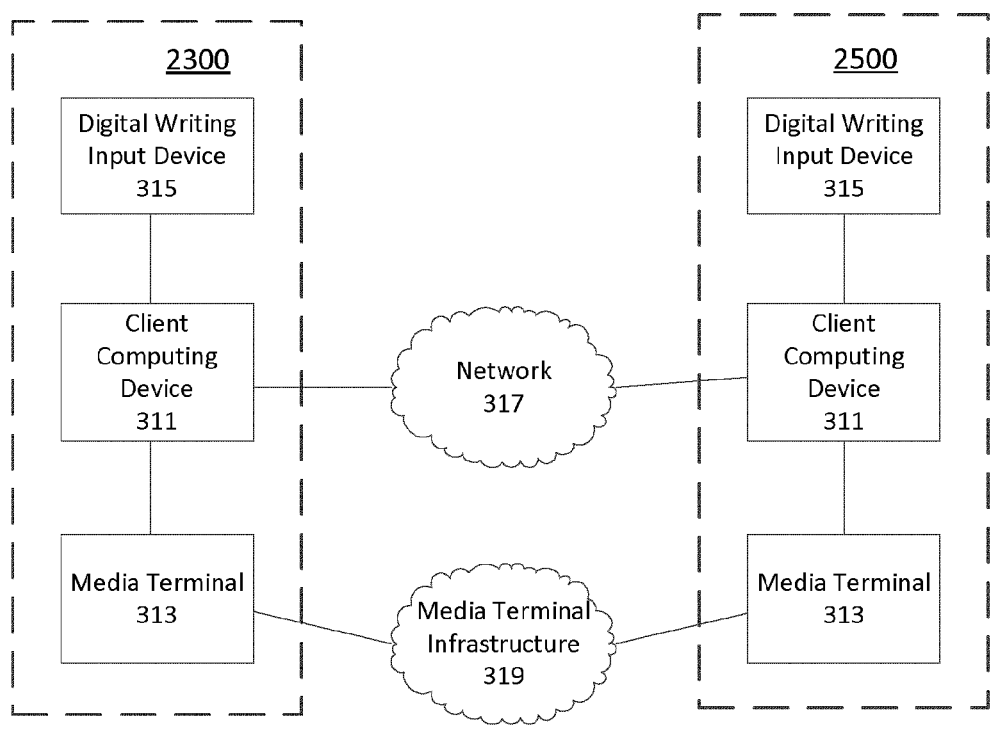
FIG. 3 is a block diagram of an example system for conducting a remote electronic signing of a document, according to some embodiments.

FIG. 3 is a block diagram of an example system 300 for conducting a remote electronic signing of a document. The system 300 may enable parties to input and receive audio/visual and electronic data simultaneously for the purposes of authentication of the signing parties, authentication of the electronic data exchanged by the parties, and storage of information corresponding to a transaction or agreement. The system may further enable parties to replicate a live transaction or execution of an agreement without the need for any geographical proximity.

It should be appreciated that the following is but one example embodiment of many possible implementations of system 300. Many variations are possible and are intended to fall within the scope of the present application.

In some embodiments, the system 300 includes one or more client computing devices (or also referred to as "client computers") 311 and media terminals 313. The media terminal is operable to provide functionality including one or more of telephone conferencing, video conferencing, and web conferencing. In some embodiments, the client computing device 311 and media terminal 313 can be implemented on the same computing device (e.g. a multimedia computer). The client computer 311 may include, for example, a desktop computing device, a mobile computing device, a smartphone, a tablet, or the like.

Figure 4A:
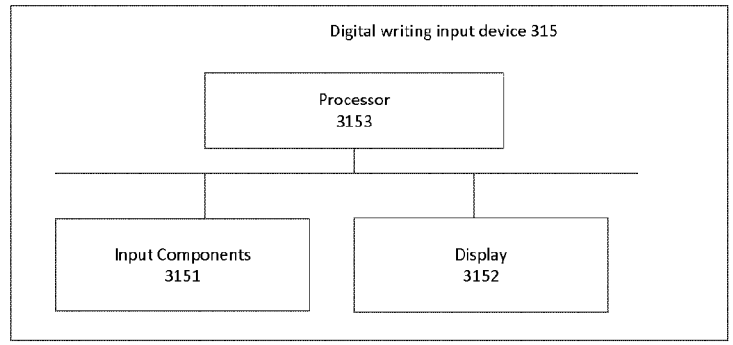
FIG. 4A is a block diagram of an example digital writing input device, according to some embodiments.

Each client computing device 311 may include or be coupled to a digital writing input device 315. In some embodiments, the digital writing input device 315 may be a mobile computing device (e.g. a mobile phone, a tablet, a personal digital assistant (PDA), or the like). As shown in FIG. 4A, the digital writing input device 315 may include one or more input components 3151, including but not limited to a stylus, a touchscreen, a pointing device (e.g. a mouse) or a keyboard, as well as a display 3152 and processor 3153. Display 3152 may be operable to display some or all of an electronic document, and can also be configured to display a signature input field to a user. In some embodiments, the display 3152 is operable to display a signature field, and a user of the digital writing input device 315 may enter a signature or other annotation using, for example, a stylus, their finger in conjunction with a touchscreen, or another input device.

In some embodiments, a client computing device 311, a media terminal 313, and a digital writing input device 315 may be part of a client terminal 2300, 2500 for signing or annotating an electronic document. In other embodiments, client terminal 2300, 2500 may simply include a client computing device 311.

Figure 4B:
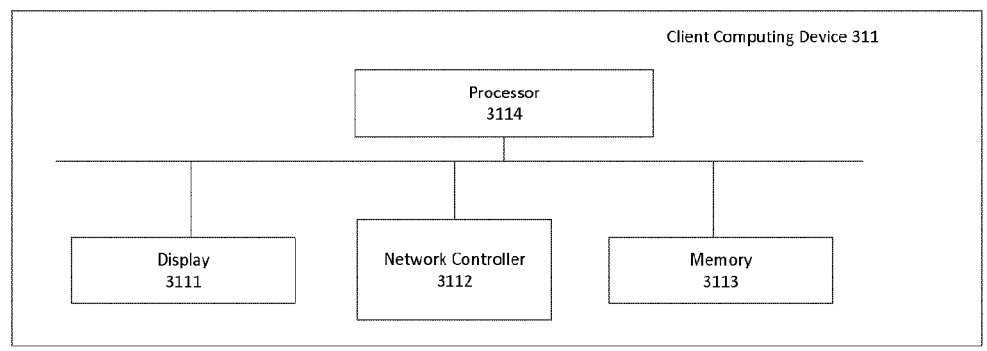
FIG. 4B is a block diagram of an example client computer, according to some embodiments.

As shown in FIG. 4B, client computer 311 may also further include a display 3111, a network controller 3112, and memory 3113. The display 3111 is operable to display data to a user, which data may include some or all of an electronic document. Memory 3113 may include one or more of random access memory, storage, and a database.

Figure 4C:
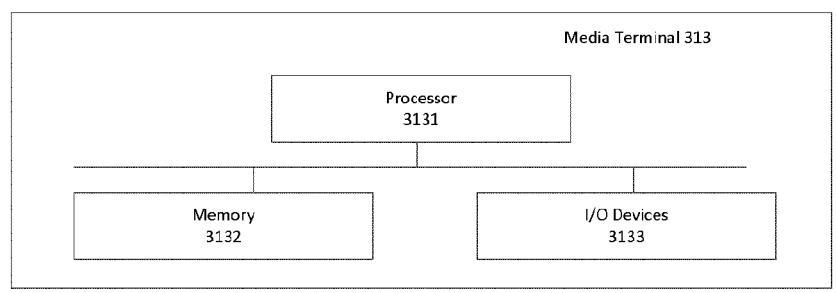
FIG. 4C is a block diagram of an example media terminal, according to some embodiments.

As shown in FIG. 4C, in some embodiments, the media terminal 313 includes a processor 3131, a memory 3132, and input/output devices 3133. I/O devices 3133 may include one or more of a display, a camera, a microphone and audio output devices (e.g. speakers).

The client computer 311 may associate with the media terminal 313 using the memory 3113 of client computer 313, such that the client computer 311 is aware of the existence of the media terminal 313 and can monitor the media terminal 313's connection status. Furthermore, the client computer 311 may be operable to intercept and record the media stream exchanged by media terminal 313 with a remote media terminal, when in use.

In one example implementation of the system 300, one or more parties can attend at a respective client computer 311 and media terminal 313. The parties may establish a media conference using the media terminal infrastructure 319. The media terminal infrastructure may include, for example, telephone dialing capabilities, as well as audio/visual conference capabilities. For example, in the embodiment depicted in FIG. 3, each media terminal 313 may have a webcam enabled, and media terminal infrastructure 319 can allow for a secure connection to be made between the two media terminals 313 and initiate a webcam conference.

In some embodiments, the input devices on a first media terminal are active to record a first user, while on a second media terminal, the second user simply watches or observes the first user without the second user being recorded. In other embodiments, the sessions are recorded without being displayed to the first or second users contemporaneously.

A content manager executing on one or more of the client computers 311 may be operable to intercept and record any media stream data which is exchanged by media terminals 313. The system 300 may record a date stamp and a time stamp correspond to the moment at which any such media conference is established and/or concluded.

The client computers 311 may also be operable to detect whether there is a corresponding client computer connected to a media conference. In this example, each side of the media conference includes a client computer 311. Each client computer 311 is able to detect the existence of the other client computer 311 through a network 317. In some embodiments, network 317 is one or more of the internet, a local area network, a wide area network, a wireless network, or the like. Furthermore, the client computers 311 may associate with each other using proprietary or known computer networking protocols, such as Transmission Control Protocol/Internet Protocol (TCP/IP). The client computers 311 thus may be operable to exchange data for the duration of a media conference or document-signing session.

In some embodiments, the system 300 is operable to facilitate the signing of an electronic document. In some embodiments, the document is digitally stored. One of the parties may direct the system 300 to load and display a digital document on display 3111 of each client computer. A date and/or time stamp corresponding to the time at which the digital document load request was executed may be stored in memory 3113 or in a secure database connected to one of client computers 311. In some embodiments, the database is a cloud database operatively connected to system 300 via network 317.

The digital document may, for example, be a contract that each party desires to be executed by the other party, such that the two parties enter into the contract. It should be noted that this application contemplates embodiments in which more than two parties desire to enter into a transaction. The digital document may also be a document which requires signing by only one party. For example, a witness involved in a foreign legal matter may have to swear an affidavit or sign a document required to be notarized.

It would be beneficial to allow one or more parties to "authenticate" or otherwise provide evidence as to their identity. Confirmation that the party executing a document is in fact the party they purport to be may reduce the likelihood of repudiation-related issues from arising later on.

In some embodiments, the parties may decide amongst themselves which party will be authenticated first. The parties may agree orally using the media terminals 313 and media terminal infrastructure 319 that one party will go first for authentication. For the purposes of authentication, one of the two parties may provide a signature or other handwriting using digital writing input device 315. The system 300 may generate a profile based on the inputted handwriting. In some embodiments, the transaction system may have one or more pre-existing profiles already stored. The received handwriting from the signing party may be compared to the handwriting in existing profiles. If the handwriting matches an existing profile, this may provide sufficient authentication for the signing party.

In some embodiments, alternative methods for authentication for a party may be provided. For example, the user's identity may be authenticated through the entry of an alphanumeric code (e.g. a PIN number), a username and password combination, or through a device MAC address that is pre-registered to a user identity. In some embodiments, the user may be authenticated using biometric information aside from handwriting (e.g. ocular scanning, facial recognition, voice recognition, fingerprint scanning, or the like).

One or more of the above-noted authentication processes may be carried out for each signing party. In some embodiments, authentication of the signing parties may be bypassed. For example, if accessed via secure email or text message, some embodiments may dispense with requiring user login information and may rely on other forms of authentication throughout the course of the signing session.

In some embodiments, as each party carries out the authentication process, one or more of the client computers 311 is operable to record the a media stream from an active computer. Date, time, location, IP addresses, or the like may be noted at the beginning and/or end of a session. In some embodiments, if a party speaks, a microphone or other input device records the audio being generated by the signing party. The recorded media stream may thus comprise a combination of one or more media streams recorded from each side of a media conference. In some embodiments, the recorded media stream includes a combination of all "active" media streams throughout the session. Once one or more signing parties have been authenticated, the electronic document may be displayed.

In some embodiments, the platform for signing sessions between users is implemented in HTML5 and therefore is supported by virtually all mobile and desktop computing platforms. Rather than requiring the installation of software on a particular user's client computer 311 or digital writing input device 315, computing devices can access a link within, for example, a web browser, which resulting website can provide some or all of the functionality described herein. Thus, a signing session may be initiated by sending an electronic message (e.g. an email, text message, or the like) to a user, who can then open the link on a computing device and proceed with the signing session.

In some embodiments, a secure email or other electronic message may be sent out to one or more intended signing parties. Each party can click a link contained within the email or message and the signing application will launch. In some embodiments, the application does not require the installation of any additional software in order to launch. Thus, once launched, the electronic document to be signed may be displayed on one or more of client computers 311.

In some embodiments, the electronic document represents an agreement or transaction between one or more of the signing parties. In some embodiments, one or more of the signing parties may be a witness that is not an actual party to the contract or agreement. In some embodiments, the electronic document is displayed on display 3111 of one or more of the client computers 311.

In some embodiments, one of the signing parties may be given augmented administrative privileges relative to other users. For example, a first signing party may be granted permission by system 300 to add annotations (e.g. the insertion of a text box underneath a signature line to provide the signing party's name in plain text) to the electronic document, whereas other signing parties may not be granted such read/write privileges. In some embodiments, the signing parties may take turns between having read/write privileges. For example, the system 300 may control access to the electronic document such that only one signing party at a time possesses read/write privileges. In some embodiments, parties may be granted access to make edits to the electronic document simultaneously. In some embodiments, a view of the electronic document is mirrored on the displays 3111 of each client computer 311. That is, if one user scrolls to a different portion of the document, the other user(s) will observe the scrolling on their display screen. In this manner, any annotations made to the electronic document would be visible to all signing parties.

In some embodiments, the user interface on display 3111 of client computer 311 may provide the user with the ability to transfer read/write privileges to a different user. For example, the system 300 can provide a button in the user interface which "locks" the ability to input annotations to one of the client computers 311. The system 300 can further provide a button which, when selected, can transfer read/write authority to a different client computer 311.

As noted above, system 300 is operable to accept signatures and other annotations in the electronic document from one or more signing parties. Signatures may be provided by signing parties in a number of different ways. In some embodiments, the user may input a signature via an input device (e.g. a mouse or a stylus). In some embodiments, the system 300 is operable to receive annotations to the electronic document. In some embodiments, once an individual inputs an annotation into the electronic (e.g. digital) document, the annotation cannot be removed. Once made, the annotations form part of an annotations file that is added to a secure electronic record (e.g. a master file as described below). The prevention of a user from removing annotations from the electronic document may improve the likelihood that the resulting executed electronic document (e.g. signed contract) will be upheld and that attempts to repudiate the agreement will be unsuccessful.

In some embodiments, rather an manually inputting a handwriting annotation or signature, a signing party may use a stored signature. For example, a signing party may enroll a signature which is stored in a signature profile in client computer 311 or an external database. The signing party may then retrieve a stored biometric signature to complete the signing, rather than manually entering in the signature. In some embodiments, the signing party must provide validation/authentication information in order to be able to access the stored signature profile.

In some embodiments, the user may input a signature via digital writing input device 315. In some embodiments, digital writing input device 315 is a smartphone or tablet. In such embodiments, system 300 may send a text message, email message, or other message to digital writing input device 315. The text message or email may include a hyperlink which the user of digital writing input device 315 can select. Upon opening the hyperlink, the smartphone is redirected to a secure website.

In some embodiments, the secure website displays a user interface similar in appearance to the signing area of a contract (e.g. a line beneath which a user would typically sign). In some embodiments, the user may enter a signature via input components 3151 (e.g. a touchscreen on the smartphone or tablet) using their finger, a stylus, or another suitable writing implement. In some embodiments, the digital writing input device is operable to record various properties of the handwriting being input by the user, such as one or more of coordinates, pressure, acceleration, cadence, speed, and rhythm. Once the user has input a signature, the user can indicate that they have finished providing their signature (e.g. by pressing a 'send' button on the user interface), and the handwriting signature data is securely transmitted.

In some embodiments, the signature then appears on the electronic document displayed on display 3111. In some embodiments, the user can proportionally re-size the signature and/or translate the signature to a different portion of the electronic document. For example, the signature can be re-sized to fit a signature area, and be dragged and released into the signature area if the signature is not already located in the signature area of the electronic document.

It should be noted that many different signing modes are contemplated herein. For example, one signing mode allows users to sign sequentially. That is, one signing party at a time provides their signature for the electronic document and an electronic compliance certificate. Upon signing, the electronic document is saved and a copy of an intermediate signed electronic document is sent to the signing party. Thus, in a case where five signatures are required, the first user would sign the otherwise unsigned electronic document, the second user would sign an electronic document which already contains the signature of the first user, and so on.

In another signing mode, referred to herein as counterpart signing mode, an unsigned copy of the electronic document may be transmitted to each signing party. In some embodiments, a link to launch an application with access to the electronic document is sent to each signing party. Each signing party is presented with an electronic document which contains no other signatures. Upon receiving the signature information, the electronic document is saved. System 300 is operable to combine the signature data for multiple signing parties and combine the signatures into one consolidated electronic document. This may be useful in cases where potentially dozens or more signatures are required for a document, or when time is of essence.

In some embodiments, in counterpart signing mode, each signing party (e.g. five signing parties) receives and signs an original copy of the electronic document and five electronic copies are returned signed. System 300 is operable to validate the signatures of each required signing party have been obtained, and provides a secure audit file (e.g. a master file) and a compliance audit certificate for the owner of the electronic document to confirm the completeness of the signed electronic document. In some embodiments, the signatures of the signing parties need not be consolidated into a single document containing all of the signatures, and the five signed copies would be sufficient for execution of the electronic document.

In another signing mode, referred to as a live session mode, the system 300 is operable to display an electronic document to the signing party on their client computer 311. In some embodiments, an operator may instruct the user as to the contents of the electronic document, and instruct the user where and how to sign the electronic document. The live session mode may be useful in call centre environments, in which the quick execution of agreements may be desirable (e.g. when executing sales transactions).

In some embodiments, a user may use an input device to enter a signature or annotation (e.g. a stylus). In some embodiments, the digital writing input device 315 and input components 3151 (e.g. a stylus and touchscreen) may be used to measure characteristics associated with the annotations. Such characteristics may include, but are not limited to, coordinates, pressure, speed, acceleration, deceleration, cadence, thickness of lines, and the like.

In some embodiments, the digital writing input device 315 may not be capable of measuring all of the above-noted characteristics or properties of a signature. For example, some mobile computing devices with touchscreens may not have the capability to capture the pressure applied to the touchscreen (e.g. some touchscreens measure changes in capacitance). In some embodiments, the digital writing input device 315 is operable to synthesize or infer one or more characteristics which cannot be measured, via software executing on one or more of digital writing input device 315, client computer 311, and media terminal 313. For example, a digital pressure profile may be created which is based on the signing party's handwriting input, including speed, acceleration, deceleration, rhythm, cadence, x-y coordinates, and the graphical structure of the signature the user provides. The digital pressure profile may further include one or more characteristics of the digital writing input device 315 or the client computing device 311 such as timestamp, device ID, device hardware information, device MAC address, byte count, associated telephone number, and so on.

In some embodiments, the system 300 is operable to retain a record of all the characteristics of any annotations and/or handwriting associated with an electronic document. Further, the system 300 may be operable to determine and record which of a plurality of individuals created each of the annotations associated with an electronic document. The storage of any such annotations and associated properties may also be used later to replicate the annotations in a physical document.

In some embodiments, the parties may choose to print a copy of the digital document and annotations/handwriting using a print command. A copy may be printed using any printing device operable to apply the document to a physical medium (e.g. paper), for example an inkjet or laser printer. A copy may also be printed on a printing device operable to print a physical copy of the document together with a biometrically and/or biomechanically accurate signature in wet ink, as described, for example, in U.S. patent application Ser. Nos. 14/469,951, 11/720,249, and 13/390,798, wherein the contents of each aforementioned patent application are incorporated herein by reference in their entireties.

It should further be noted that whenever a user makes any kind of modification to the electronic document, once that change has been made, it cannot be undone. That is, in some embodiments, each change made to the electronic document is permanent. Therefore, analogous to actions involving ink in the physical world, the annotations and markings made by a user may not be possible to be erased. In some embodiments, the changes made to a document are not permanent until the user has saved the changes.

In some embodiments, the system 300 is operable to send a secure email or other secure communication to each signing party containing the electronic document complete with each annotation and signature made by the signing parties. In some embodiments, a time, date and/or location stamp may be stored which logs the moment the print command is issued.

In embodiments in which signing parties take turns signing the electronic document sequentially, the system 300 may send an electronic copy of the document as signed by a signing party. For example, if there are five signing parties signing the electronic document sequentially, then when the second user signs the document, the system 300 may send an electronic version of the document with two signatures (i.e. the first user and the second user's signature). Upon completion of signing the document by each of the five parties, the system 300 may additionally send a copy of the fully signed document to all five signing parties. In some embodiments, a time, date and/or location stamp may be stored which logs the moment any version of the electronic document is transmitted to one or more of the users.

Figure 5:
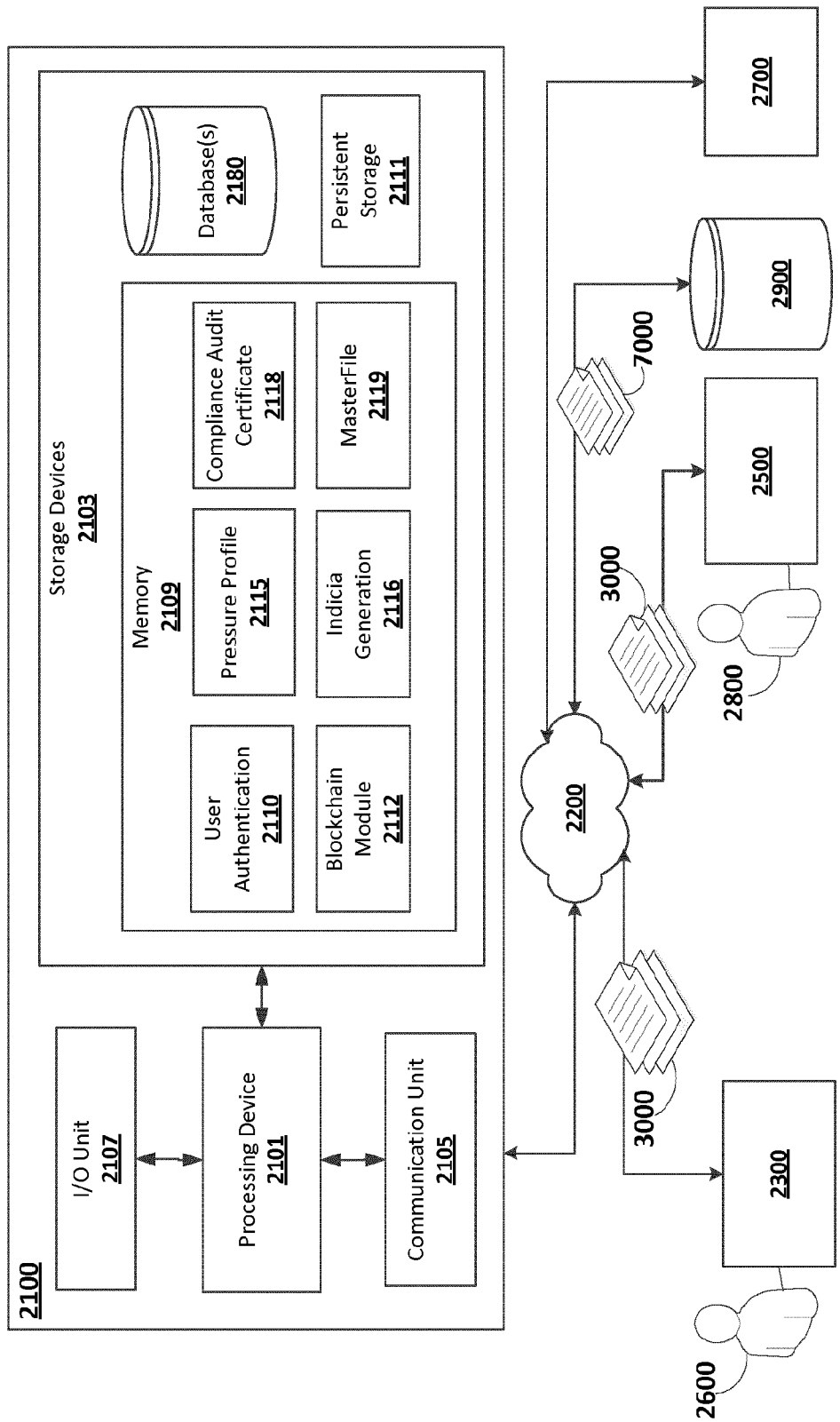
FIG. 5 is a block diagram of an example system platform for remote signing of a document, according to some embodiments.

Referring now to FIG. 5, which illustrates a block diagram of an example system platform 2100 (or simply "system 2100") for remote signing of a document, according to some embodiments. The system 2100 may include I/O unit 2107, processing device 2101, communication unit 2105, one or more storage devices 2103. Storage device 2103 may include memory 2109, databases 2108 and persistent storage 2111.

System 2100 may be connected via a network 2200 to one or more client terminals 2300, 2500 for facilitating one or more users 2600, 2800 to execute, sign or annotate an electronic document 3000 remotely. Once an electronic document 3000 has been successfully executed or annotated, a corresponding master file 7000 may be generated by system 2100 and transmitted to a secure database 2900. A printing device 2700 (e.g. LongPen™ device) which is operable to emulate and print biometrically and biomechanically accurate signatures may be connected to system 2100 for generating wet ink signatures, master files, and executed documents on demand.

In some embodiments, printing device 2700 may be configured to print the entire document including original text, and digital handwritings including annotations and signatures.

A processing device 2101 can execute instructions in memory 2109 to configure user authentication unit 2110, pressure profile unit 2115, compliance audit certificate (CAC) unit 2118, blockchain unit 2112, indicia generation unit 2116, and master file (or MasterFile) unit 2119. A processing device 2101 can be, for example, any type of general-purpose microprocessor or microcontroller, a digital signal processing (DSP) processor, an integrated circuit, a field programmable gate array (FPGA), a reconfigurable processor, or any combination thereof.

Memory 2109 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O unit 2107 enables system 2100 to interconnect with one or more input devices, such as a keyboard, mouse, camera, touch screen and a microphone, or with one or more output devices such as a display screen and a speaker.

Each communication interface 2105 enables system 2100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

User authentication unit 2110 is operable to register and authenticate users (using a login, unique identifier, and password for example) prior to providing access to applications, documents, a local network, network resources, other networks and network security devices. System 2100 may serve one user or multiple users. For example, user authentication may be performed through verification of a PIN or security code sent to a mobile device, correct login information (e.g. username and password), biometric verification such as ocular scan, fingerprint scan, a facial scan, an iris pattern, a retina pattern, a voice recording, or a handwritten signature.

Pressure profile unit 2115 may be configured to generate a digital pressure profile based on a user's handwriting. A pressure profile may be generated for each digital signature or annotation. A pressure profile may also be generated for each registered user 2600, 2800. In some embodiments, a digital pressure profile may include various parameters and characteristics of handwriting, such as speed, acceleration, deceleration, rhythm, cadence, x-y coordinates, and the graphical structure of the handwriting. The digital pressure profile may further include one or more characteristics of the digital writing input device 315 or the client computing device 311 such as timestamp, device ID, device hardware information, device MAC address, byte count, associated telephone number, and so on. A digital pressure profile of a signature may be used to forensically verify if the signature was originally provided by a specific user, even when physical pressure data associated with the signature is not available. For example, based on recorded characteristics of handwriting, such as speed, acceleration, deceleration, rhythm, cadence, x-y coordinates, and graphical structure of the handwriting, as well as additional information regarding a client computing device 311 at the time of handwriting generation, such as such as timestamp, device ID, device hardware information, device MAC address, byte count, and/or associated telephone number of the device 311, a forensic expert or examiner may be able to determine that the handwriting belongs to user 2600 of client terminal 2300 including client computing device 311.

In some embodiments, a digital pressure profile may also include physical pressure data of a signature, if client computing device 311 is configured to capture the physical pressure information when a signature or annotation is provided by a user 2600, 2800.

In some embodiments, a digital pressure profile may be referred to as a handwriting profile.

Blockchain unit 2112 may include a cryptography sub-unit (not shown) for encrypting and decrypting information in one or more blockchains. For example, cryptography sub-unit may apply various encryption algorithms and/or techniques to verify information in a block. In some embodiments, the cryptography sub-unit may be configured to generate information which may be utilized in the formation and/or generation of one or more blocks for insertion and/or addition into the blockchain 6000.

Blockchain unit 2112 may be configured for maintaining relationships and/or associations identifying how blocks may be related to one another, and/or the identity of various blocks (e.g., identifying what information is associated with each block). Blockchain unit 2116 may be configured for maintaining and updating one or more blockchains 6000, which may be stored locally at database 2800. Blockchain unit 2112 may be configured updating blocks, adding blocks, deleting blocks, validating new blocks, rejecting new blocks, and so on.

Blockchain unit 2112 may be configured to maintain and update blockchain 6000, and in particular, to generate new blocks 6200, 6300, 6400 in order to update blockchain 6000 in a process further described with respect to FIG. 6 below.

Persistent storage 2111 may be configured to store information associated with the blockchain, such as the blockchain ledger, blockchain entries, information stored on various blocks, linkages between blocks, rules associated with the blockchain, etc. Storage device 2103 and/or persistent storage 2111 may be provided using various types of storage technologies, such as solid state drives, hard disk drives, flash memory, and may be stored in various formats, such as relational databases, non-relational databases, flat files, spreadsheets, extended markup files, etc.

Indicia generation unit 2116 may be configured to generate one or more handwriting indicia including signatures, annotations, notes and other handwriting marks based on user input received through client computing device 311. In some embodiments, an indicia may include one or more of: a signature, an annotation, a visual icon, and a digital code. The digital code may be a hash code automatically generated and encrypted. A user input may include a digitally captured handwriting annotation or signature, a signal indicating a request for automatic generation of a digital signature, or a signal indicating an acceptance of a digital signature that is pre-populated for a user or a client computing device.

Compliance Audit Certificate (CAC) unit 2118 may be configured to generate a digital CAC 5000 for each electronic document 3000 that is executed or annotated. CAC 5000 may form part of an executed or annotated document 3500. In some embodiments, a CAC may include information with respect to each party that has signed, annotated, or witnessed the document 3000. For each party, there may be recorded, as part of CAC, the party's name, email address, telephone number, signature, and supporting identification.

Master file unit 2119 may be configured to generate a master file 7000 for each electronic document 3000 that is executed or annotated. The master file 7000 may be a secure electronic data file which is operable to index a plurality of recorded data files relating to a transaction or signing session carried out using the systems and methods described herein. In some embodiments, a master file 7000 may include various information regarding a transaction or signing session such as, GPS location, IP address, device MAC address, telephone information, e-mail, time spent on generating each signature or annotation, and video/audio data stream of each party.

Figure 6:
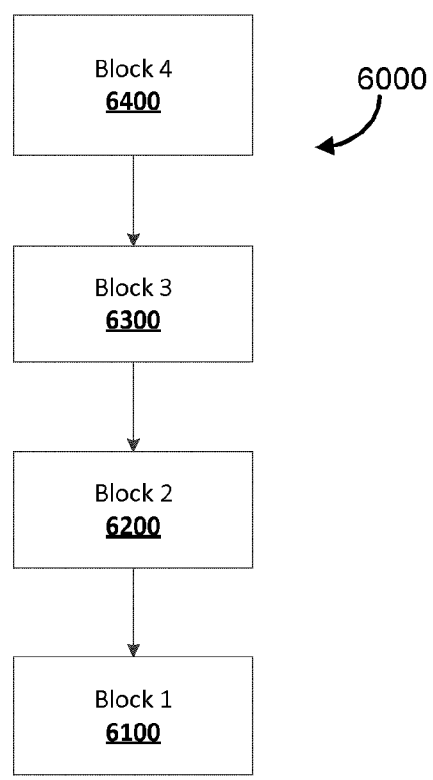
FIG. 6 illustrates an example blockchain, according to some embodiments.

FIG. 6 illustrates an example blockchain 6000, according to some embodiments. A blockchain 6000 described herein may be a tamper-proof, distributed digital ledger stored in one or more databases that is configured to record transactions or electronic documents 3000 in a public or private peer-to-peer network. A blockchain 6000 may be managed and maintained by blockchain unit 2112 of system 2100. Distributed to all member nodes in the network, the ledger 6000 may permanently record, in blocks, the history of asset exchanges (e.g. a real estate property) that take place between the peers in the network. All the confirmed and validated blocks may be linked and chained from the beginning of the chain to the most current block. The blockchain thus may act as a single source of truth, and members in a blockchain network may view transactions or documents that have been executed by them, or in some embodiments, may view all the blocks of a blockchain. In some cases, each member (each node) in the network is its own authority, and anyone may participate in a transaction and execute an agreement in the form of an electronic document. In some cases, the right to participate in exchanging information on a blockchain may be limited to certain users.

In some embodiments, system 2100 may manage a blockchain network through an available framework (e.g. Ethereum). A public key address (or simply "public address") may be generated by blockchain unit 2112 for each electronic document 3000, which can be used as an address for a block in blockchain 6000. Each document 3000 may then have a corresponding public address associated therewith. The corresponding public address may be incorporated within the electronic document, or within the corresponding compliance audit certificate 5000, or within the corresponding master file 7000.

Based on the public address, a client computing device with the appropriate user access rights may query the address and retrieve relevant details of the electronic document 3000, or an executed version 3500 thereof.

In some embodiments, electronic document and/or an executed version thereof may be encrypted using an appropriate encryption method (e.g. SHA256) prior to being stored in a block within blockchain 6000. For example, an executed version of document stored in PDF or Word format may be encrypted and converted to a hash file, which is then stored in a block.

In some embodiments, a master file 7000 can also be encrypted, hashed and stored within a block on blockchain. The encrypted master file 7000 may include information regarding the executed agreement, an audit history, and may contain a public key address of the block within which the master file 7000 is stored.

In some embodiments, once all parties to a document have executed the document, then transaction is considered closed and the blockchain 6000 can no longer be expanded with new blocks. The blockchain may then be used as a proof document, which can be used to show that the executed document, as well as the corresponding master file, have not been tampered with.

In some embodiments, a blockchain 6000 comprising one or more blocks 6100, 6200, 6300, 6400 may be provided by system 2100. In some embodiments, one or more blocks 6200, 6300, 6400 may contain a pointer to an immediately preceding block.

In some embodiments, blockchain 6000 may be operable to audit or verify a single transaction based on information stored in one or more blocks, and provide an irrefutable proof of transaction to a third party upon request. The irrefutable proof of transaction may be provided by way of a forensically and legally defensible, digital signature within a block.

Figure 7:
FIG. 7 is an example schematic diagram of an example block in an example blockchain, according to some embodiments.

FIG. 7 is an example schematic diagram of an example block 6200 in an example blockchain 6000, according to some embodiments. In some embodiments, an electronic document 3000 may be executed or annotated by one or more users or parties. The electronic document 3000 may be for example an agreement representing terms for a transaction acceptable to the parties of the agreement, such as an agreement of sale and purchase of a real estate property. Each user may use a respective client computing device 311 to enter user input required to generate a digital signature. Each time a valid digital signature is generated and incorporated into an electronic document 3000, a new block may be generated and appended to blockchain 6000. For example, block 6200 may include one or more of the following fields: a pointer to a preceding block 6210, user identity information 6220, a timestamp (including date) 6230, the digital signature or annotation 6340, a compliance audit certificate 6350, and a pressure profile 6360 for the signature. Though not illustrated, block 6200 may also contain additional fields such as error checksum, an expiry date of any of the signatures or the agreement itself, information regarding an asset, if applicable, being exchanged through the agreement, and so on.

Prior to generating a block 6200, blockchain unit 2112 may, via user authentication unit 2110, that a user identity is valid. In addition, a cryptography sub-unit may be configured to decrypt and verify that the any encrypted user credential information are authentic. Once a user identity has been properly authenticated, the user identity information may be stored in field 6220.

Timestamp field 6230 may include data representing the precise date and time at which the a signature or annotation is made within the electronic document 3000.

Annotation or signature field 6340 may store data representing a digital signature or annotation made by a user. The digital signature or annotation may be an indicia generated based on user input. This field 6340 may store, in some embodiments, a link to the digital signature or annotation stored in a database.

Compliance audit certificate field 6350 may include the CAC 5000 associated with the signature or annotation in field 6340, or alternatively, a link to the CAC 5000 stored in a database.

Pressure profile field 6360 may store information within a digital pressure field for the signature or annotation stored in or linked by field 6340.

In some embodiments, the data within each field may be generated using a cryptographic hash function such as SHA256 with a private key only held by system 2100, as to prevent unauthorized tempering of blockchain 6000.

In some embodiments, blockchain 6000 may be configured to implement a smart contract. A user can register and authenticate an identity via system 2100 or an authorized third party, and is then issued a private/public key pair. The public key may serve as an address at which the user can receive digital currency, and the private key may be stored in the user's private digital wallet, and used to sign various contracts and documents. The blockchain is configured to support one or more signers and one or more assets (whether tangible or intangible) such as a mortgage and associated property. Each party may sign a document with their own digital signature and their own copy of private key. Each document, which may be a smart contract, can include assignment of one or more assets. Assets can also be registered and verified by system 2100 (or via a third party service). For example, a registered asset may be associated with an owner having a digital wallet at a public key address in a blockchain. The registered asset can be transferred as part of the smart contract to another party, once the smart contract has been executed in full.

Optionally, a cryptocurrency value can be associated with an registered asset within the smart contract. This way, in order to fully execute a smart contract, one or more signing parties need to sign the contract with their private key, as well as include a cryptocurrency payment in an appropriate amount in order to convey the registered asset from an assignor (e.g. previous owner) to assignee. Once the smart contract has been fully signed by all parties, and the appropriate payment has been made in cryptocurrency as recorded and witnessed by all nodes on the blockchain 6000, the registered asset may be transferred to a new address (e.g. a new digital wallet) belonging to the assignee, executing the agreement within the smart contract in full. The smart contract also supports the option to hold the payments in escrow until system 2100 or an authorized $3^{rd}$ party escrow agency verifies the transfer of the registered assets and approves the smart contract. At the end of the transaction, each party may be provided with an executed electronic document 3500 with digital ink and blockchain signatures from each party.

Figure 8:
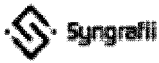
FIG. 8 illustrates an example compliance audit certificate, in accordance with some embodiments.

In some embodiments, the electronic document may contain an additional page(s) or portion, referred to herein as a Compliance Audit Certificate (CAC) 5000. FIG. 8 illustrates an example compliance audit certificate 5000, which may be digitally generated, in accordance with some embodiments. As depicted, the CAC contains entries for each party to a signing session or agreement. For each party, there may be a space for one or more of the party's name, email address, signature, and supporting identification.

As depicted, each party in FIG. 8 may be required to enter an additional signature 4000a, 4000b. In some embodiments, signatures in the electronic document cannot be duplicated. As such, any signatures or annotations previously added by a user to the electronic document cannot be replicated for use in the CAC. Thus, each user must provide an additional signature for the CAC. The process for signing the CAC is similar to the process noted above in that the system is operable to send a text message, email or the like with a link which may allow the user to enter a signature via a digital writing input device 315 (e.g. a smartphone or tablet). Alternatively, the user may enter a signature using an input device on client computer 311 (e.g. a mouse). In some embodiments, the signature provided by the first signer in the example CAC in FIG. 8 has been re-sized to fit the "Sign Here" field. In some embodiments, the CAC may include an additional copy of the original signature in the box above the "Sign Here" field, wherein the additional signature would represent the original signature as input, without any re-sizing, as shown in FIG. 8.

In addition to the signature fields, the compliance audit certificate 5000 may further provide a "Supporting Identification" field. Here, the signer may enter additional information or data 5100*a*, 5100*b* which may serve to confirm the signer's identity. For example, the supporting identification for the first signer is in the form of an identification card 5100*a*. As another example, the supporting identification for the second signer is in the form of a photo of the signer's student card 5100*b*. Other examples may include business cards, government-issued photo ID cards, credit cards, or the like. In some embodiments, the system 300, 2100 provides barcode scanning capabilities. For example, in some embodiments, the system 300, 2100 includes a scanner which is operable to scan the back of a government-issued identification card, or a magnetic strip reader operable to electronically capture the user information stored on that identification card. In some embodiments, the information obtained from scanning the barcode or magnetic strip of an identification card may be extracted and used to populate various fields in the electronic document or agreement. Further, the information obtained from scanning may be used to verify the identity of a signing party, for example by polling a third-party database that contains information purported to belong to the individual presenting that identification card. Such information may include, for example, photographic images, or physical characteristics (e.g. height, weight, eye colour, or the like) as stored in the third-party database.

It will be appreciated that the photo ID cards, business cards and driver's licenses are merely examples of what can be input as supporting identification. In some embodiments, when the prompt is opened on digital writing input device 315 to accept a signature, the user interface on digital writing input device 315 may also allow the user to take a photo using, for example, a camera on digital writing input device 315 (as is commonly integrated with many mobile computing devices at the present time). The user may use the camera to take a photo of his or herself (e.g. a "selfie"), for example. Moreover, it should be noted that the system is operable to carry out a media conference while the signing session is underway, and so the other signing party or parties may be able to witness the other signing party taking a photo of themselves, or the like. It should be further noted that all actions taken by the user in signing or otherwise modifying the compliance audit certificate may be included in a master audit file which documents details of the signing session.

In some embodiments, the compliance audit certificate includes a QR codes 3400 for each signature. The QR code may provide a direct link, when scanned, to data which defines the signature of that user. For example, if using a printing device (e.g. a LongPen™ device operable to reproduce biometrically and biomechanically accurate handwriting), the printing device may be operable to scan the QR code and obtain therefrom the necessary data to retrieve and reproduce the signer's signature via secure QR code links. In some embodiments, the QR code used to retrieve the information is specifically and securely tied to the particular signing session to which the signatures correspond. That is, a signature used in signing a first electronic document in a first signing session could not be copied or used to sign a second electronic document which was not part of the first signing session. In some embodiments, if the QR code of a user's signature is scanned, the system 300 is operable to notify the user that their signature has been reproduced, for example via email or text message, or any other suitable notification form.

In some embodiments, the compliance audit certificate further includes a session-specific QR code (located at the bottom of the CAC 5000 in FIG. 8) which, when scanned, can transmit a link to the scanning party to the signing session details of the electronic transaction or signing session. In some embodiments, this QR code 3400 is present on each page of the electronic document, as well as on the CAC 5000. In some embodiments, the session-specific QR code is added to the electronic document server-side when the signing session is created. The session-specific QR code may bind all pages, participants, master file and CAC signing activities. For example, scanning the QR code at the bottom of the CAC depicted in FIG. 8 may send the link to the scanning party in order to view information regarding the online signing session. The linking of the CAC to the online document transaction is permanent, in some embodiments. The QR code may be used as a form of authentication (e.g. QR code Server Authentication).

When the parties decide to conclude the signing session, one or more of the parties may choose to terminate the session using a termination command provided on client computers 311. Upon termination, a date, time and location stamp may be stored. Alternatively, the parties may choose to terminate the transactions using a termination process provided by the media terminals 313. Since the client computers 311 can monitor the connection status of media terminals, the date, time and/or location stamps may be stored based on the termination time of the media conferencing connection.

At the conclusion of the signing session, a secure electronic data file (referred to hereinafter as a master file) may be stored at one or more of the client computers 311. In some embodiments, the master file may be copied to one or more of the other client computers 311 in system 300. In some embodiments, the master file is stored in a remote database (not shown) external to any of client computers 311. In some embodiments, the database is a cloud database.

FIGS. 9A-9G illustrate various contents of an example master file 7000, according to some embodiments. The master file 7000 may be a secure electronic data file which is operable to index a plurality of recorded data files relating to a transaction or signing session carried out using the systems and methods described herein.

According to some embodiments, the system 300, 2100 is operable to combine information generated from the client computer 311 and media terminal 313 (including I/O devices 3133, e.g. stylus, camera, microphone, touchscreen, speakers, or the like) into a secure electronic data file (referred to herein as the master file). The master file may therefore include (but is not limited to) one or more of the following information elements: executed electronic document 3500, status information 7100 regarding each signature or annotation, digital document identification numbers, annotation files, media stream files, files identifying an originating computer identification number corresponding to one of the client computers 311, files identifying a receiving computer identification number corresponding to at least a second of the client computers 311, internet protocol addresses corresponding to the client computers 311, date stamps, time stamps, locations of a signing party 7150, a message log 7200, document access history 7300, information regarding signatures 7400 transmitted from various client computing devices, information regarding images 7500 transmitted from various client computing devices, a signing log 7600, time periods spent with a page being displayed, one or more counts of edits made to the electronic document, one or more counts of signatures added to the electronic document, a total time from beginning to end of the signing session, and the like.

In some embodiments, a signing log 7600 may include a data log for each annotation 4005 or signature 4000*a*, 4000*b*, 4000*c*, 4000*d* (see e.g. FIGS. 9E and 9F).

In some embodiments, the time and date stamp within each signing log entry may correspond to a respective event occurred during a signing session, including login times, times at which the page display was changed, times at which a party spoke, times at which a party makes an input using an input device, or the like. There may be other events that cause a data or time stamp to be generated and stored in the master file 7000.

The master file 7000 may be encrypted using a method of digital encryption, a proprietary method of digital encryption, or a digital protection measure. For example, the master file may be associated with a hash code. If the master file is tampered with, the hash code will no longer correspond to the master file. Therefore, it may be possible to determine whether the master file has been tampered with.

As noted above, some embodiments may include components and functionality for recording a media during a signing session or transaction. In some embodiments, the system 300, 2100 may include an audio recorder without a video recorder (e.g. a microphone). For simplicity, the following example includes both audio and video recorders (e.g. a video camera or webcam, or the like). Some embodiments of the systems and methods disclosed herein are operable to record a media stream including audio and video corresponding to each client computer 311. In some embodiments, the master file includes a single data stream.

In some embodiments, there may be a plurality of client computers 311. As such, the media stream may combine media feeds from different or all of the client computers 311. Some embodiments may select a particular client computer 311 from which to collect a media stream, at any given moment, by selecting the media stream corresponding to the client computer 311 which is collecting inputs at a particular moment. The inputs being collected may include an individual speaking into a microphone, an individual inputting data (e.g. a signature or annotation), or the like. In some embodiments, the master file includes some of all of the media streams from the one or more client computers 311 in system 300, 2100.

In some embodiments, the systems and methods disclosed herein do not necessarily require a third party to host and/or store the master file. In this regard, the master file may be stored at one client computer 311 or a plurality of client computers 311 connected by network 317 for any particular transaction or signing session. In some embodiments, the parties may choose or otherwise designate a third party database (e.g. database 2900) operable to store the master file 7000.

The master file 7000 may in turn be used later as evidence that a particular interaction or transaction took place between the signing parties that attended at client computers 311 at the time the master file was created. The master file may be retrieved at any time from its place of storage, provided the proper permissions are satisfied by the party seeking to retrieve the document. In some embodiments, there are no permissions required to retrieve the master file.

The contents of the master file may be played back in their entirety or in portions. If played back in full, an individual may select whether to play back one media stream or several media streams and the set of inputs recorded. The individual may also choose to play back a portion of the master file, the starting point of which may correspond to any of the stored date and time stamps. In some embodiments, the entire signing session may be played back. For example, the client computer 311 may display a replication in real or speed-adjusted time of the movements of the pages of the electronic document, the annotations and signatures made to the electronic document, text inputs, mouse clicks, or the like, and present these occurrences as an animation which shows what took place during the signing session.

Other examples of suitable systems for signing electronic documents are described in, for example, U.S. patent application Ser. No. 11/720,429, issued as U.S. Pat. No. 8,867,062, U.S. patent application Ser. No. 14/469,951, U.S. Pat. No. 8,296,832, U.S. patent application Ser. No. 12/427,070, issued as U.S. Pat. No. 8,843,552, U.S. patent application Ser. No. 13/390,798, and PCT Application No. PCT/CA2016/000260, the contents of each of the previously identified patent applications and granted patents being hereby incorporated by reference in their entireties.

As noted in FIG. 2, in some embodiments, the system 300 is further operable to transmit the signed Compliance Audit Certificate for printing and ultimate delivery to a signing party, or a party of the signing party's choosing. For example, after the signing session has terminated, the system 300 can forward copies of the signed electronic document to one or more of the signing parties, which need not be physically printed. In the case of documents which are highly confidential, it may be preferable not to print a physical copy of the actual electronic document, as physical copies may be misplaced and the contents may be publicized.

However, in some embodiments, the signed Compliance Audit Certificate (which serves as evidence in the event of an attempt at repudiating the agreement signed electronically) can be delivered to one or more signing parties in physical form, with a wet ink signature.

In some embodiments, the signed Compliance Audit Certificate is transmitted to a delivery service. The delivery service has access to a printing device which is operable to print the CAC and reproduce biometrically and biomechanically accurate signatures of each signing party. For example, the delivery service may use a LongPen printing apparatus, as described above. As a further example, the LongPen printing apparatus may comprise a scanning device which can be used to scan the QR codes on the CAC to obtain instructions for reproducing the handwriting of the signing parties.

Thus, in cases where signing parties are located across the world from one another, after executing the electronic document via system 300, 2100, system 300, 2100 can then transmit the signed CAC to a third party which may be located within reasonable proximity of the signing party. Depending on the location of the signing party, it may not always be possible to deliver a physical copy of the signed CAC to the signing party in the same day, but the expenditure of resources required to deliver the physical copy of the CAC would be greatly reduced in any event.

Once the physical copy of the CAC with the original wet ink signatures has been reproduced, the physical copy can then be physically delivered to the signing party, where the physical copy of the signed CAC may be retained for compliance purposes. The rapid provision of a physical CAC may inspire confidence in the validity of a transaction, as physical evidence may be obtained and stored quickly.

It should be further noted that, in some embodiments, the QR code on the physical copy of the CAC may further be used to access the transaction data associated with the document signing session. For example, if the signing party requires an original copy of the electronic document with wet ink signatures, the signing party can use, for example, a LongPen printing apparatus to scan the QR code and obtain the necessary information and print a physical copy of the electronic document complete with wet ink signatures. In some embodiments, the LongPen printing apparatus can further be used to apply wet ink versions of any handwritten annotations to a physical document, in addition to those which were made in the signature fields in the electronic document.

Moreover, in some embodiments, the electronic copy of the signed electronic document (which is delivered via secure email or other electronic message to each signing party), contains a QR code therein (for example, in the bottom left hand corner, or any suitable other location not already occupied with text). In some embodiments, this is the same as the QR contained in the bottom lefthand corner of the CAC in FIG. 8. The QR code in the electronic copy of the signed electronic document may be scanned in order to obtain the data required to reproduce a physical copy of the electronic document with wet ink signatures that are biometrically and biomechanically accurate.

In some embodiments, the system 300, 2100 is further operable to track the shipping status of the physical version of the signed CAC. The shipping information, including any changes to the status of the shipping (e.g. arrival at a sorting facility, attempts to deliver the document which were unsuccessful, confirmation of successful delivery of the physical copy of the CAC) may be included in a secure audit file (e.g. the master file, as noted above).

Although some example embodiments depict the CAC being transmitted to a delivery service, it should be appreciated that in other embodiments, one of the signing parties may opt to use their own printing device (provided the printing device is capable of reproducing biometrically and biomechanically accurate signatures, as with the LongPen printing device referred to above) to produce a physical copy of the signed CAC with wet ink signatures.

Figure 12:
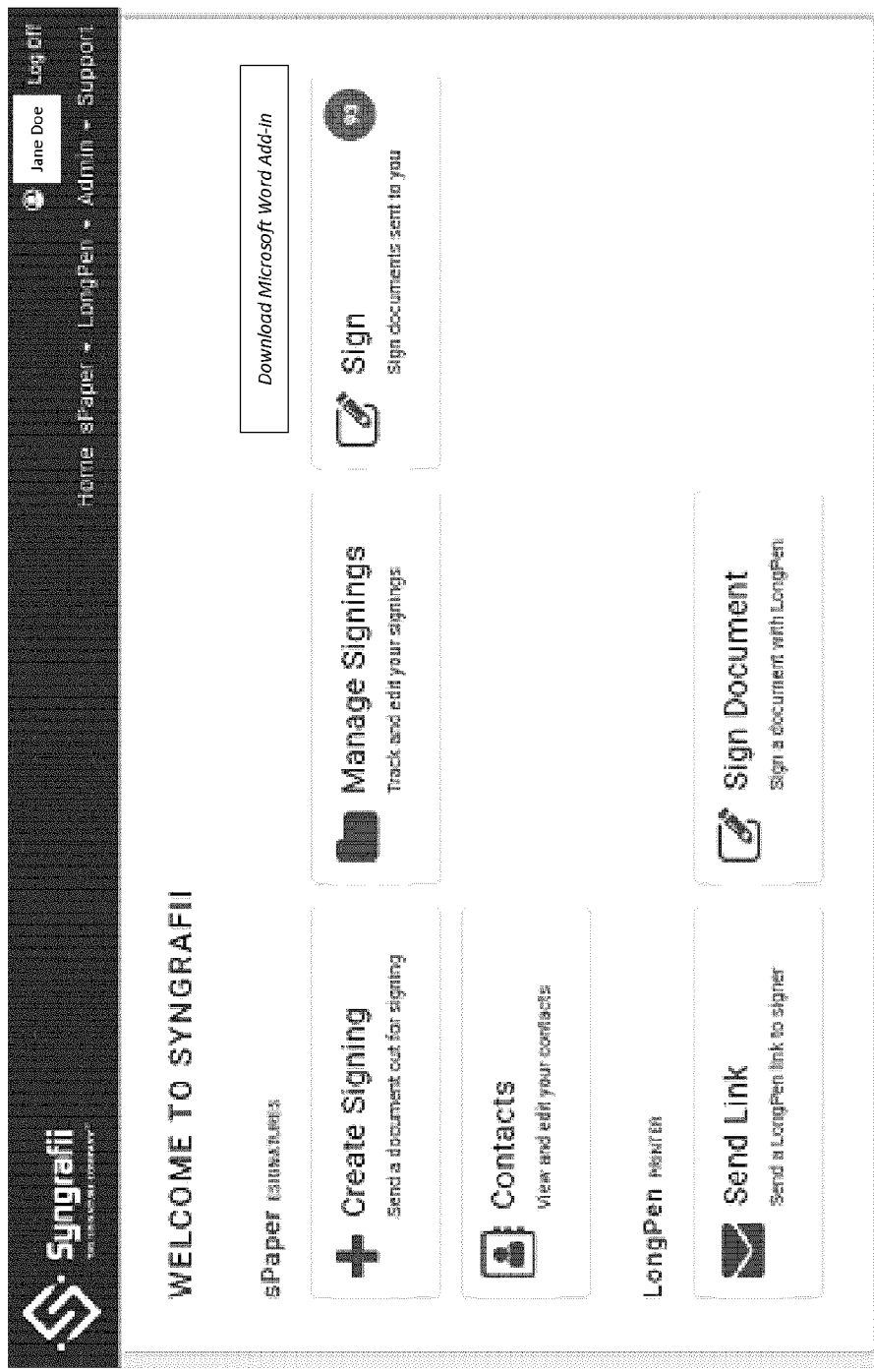
Figure 13:
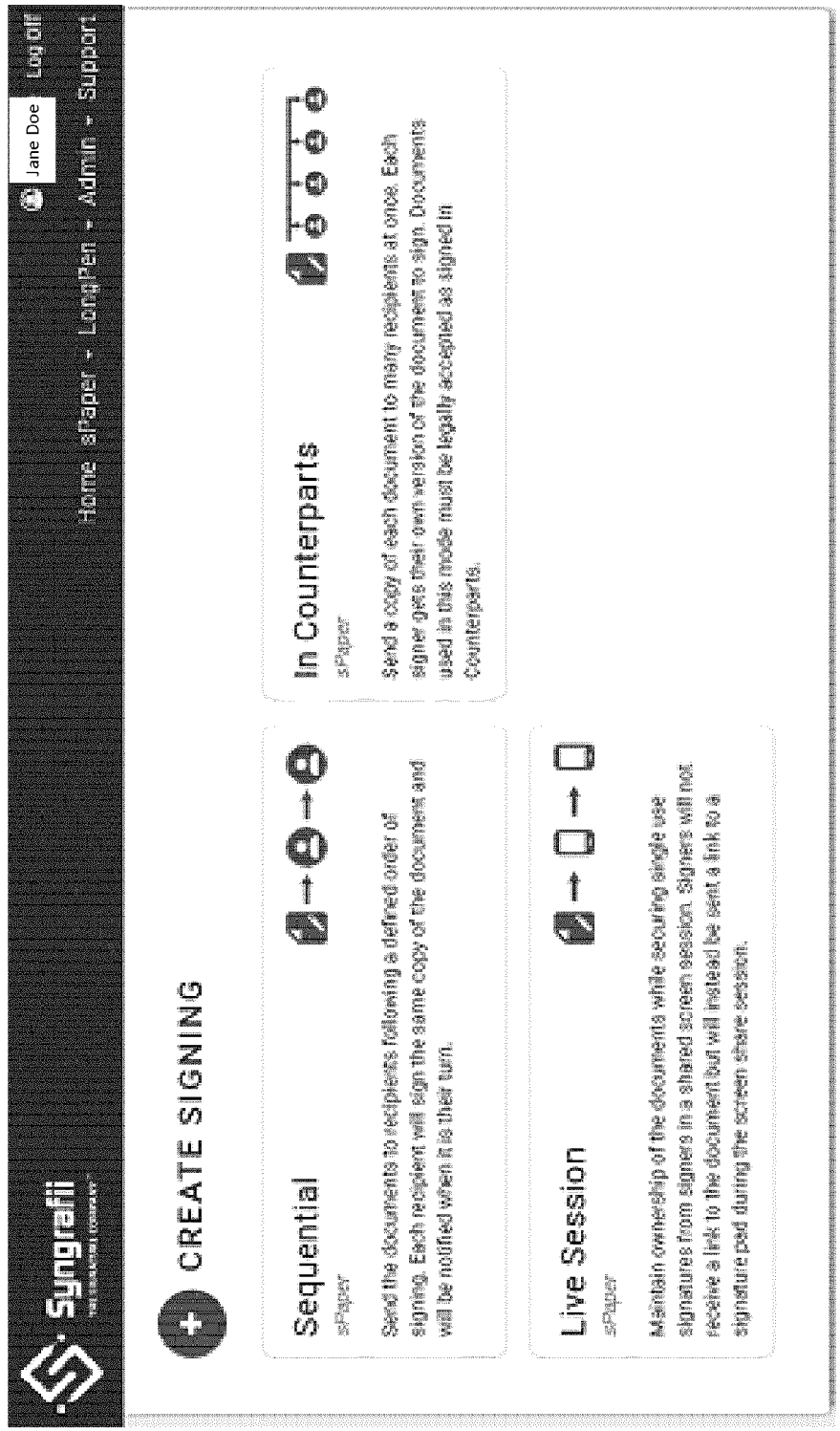

As shown in FIG. 12, which illustrates an example user interface of a system platform 2100 for remote signing of a document, according to some embodiments. A user (e.g. Jane Doe), once logged into the platform 2100 through user authentication, is presented with a number of options to create or manage documents for execution or annotation. For example, the user may: upload and send a document for execution or annotation, manage existing documents that have been uploaded and/or sent for execution or annotation, manage contacts which may be used to populate signing party information, choose to send a link to a signer or print or "sign" a document with a printing apparatus such as LongPen™.

FIG. 12 shows an example user interface listing three different modes of signing sessions: sequential, in counterparts, and live session, which are each described below.

Figure 10:
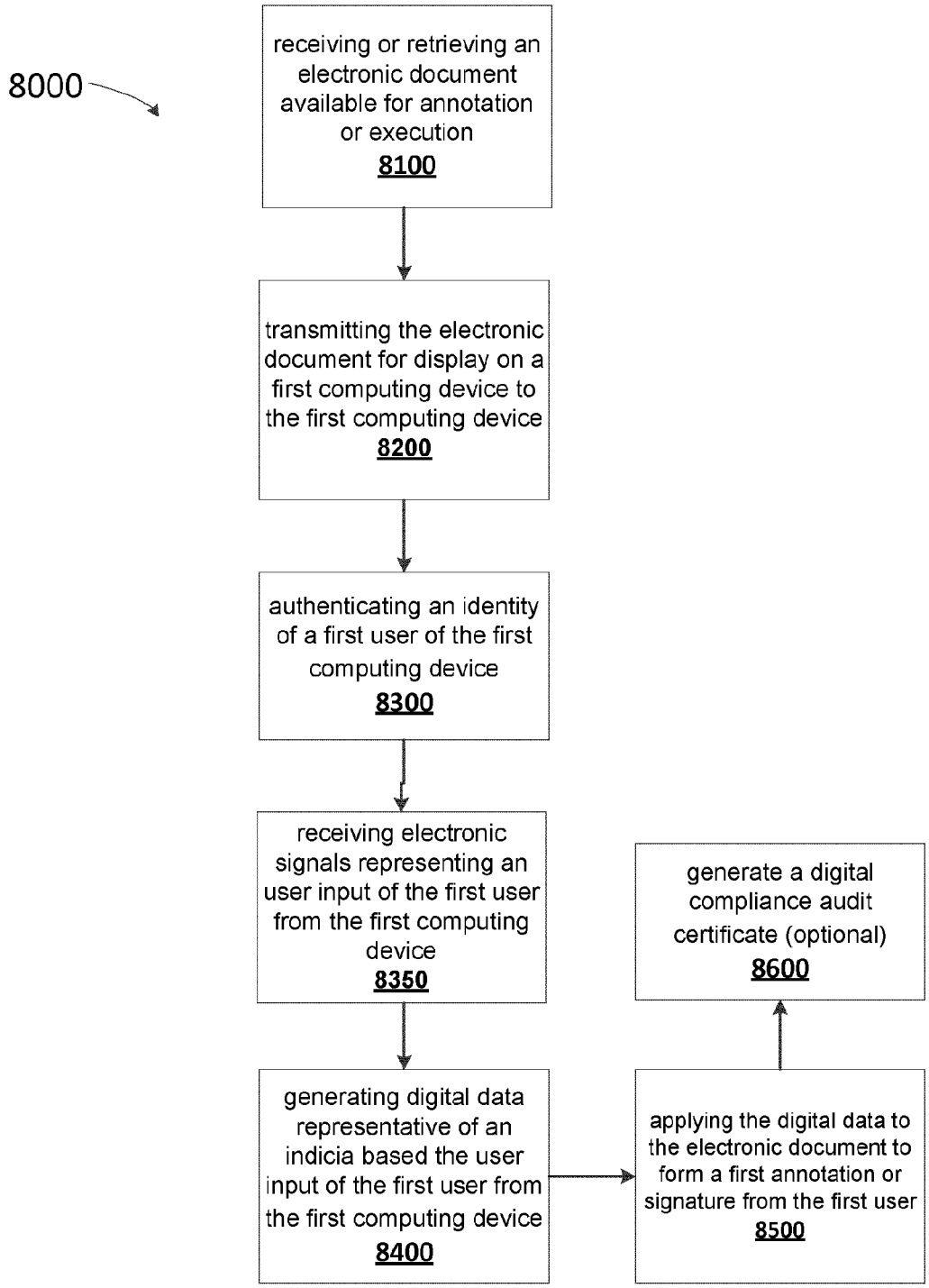
FIG. 10 illustrates a flow diagram of an example process for executing or annotating a document, according to some embodiments.

Referring now to FIG. 10, which illustrates a flow diagram of an example process 8000 for executing or annotating an electronic document 3000 by one or more parties, according to some embodiments.

At step 8100, system 2100 may receive or retrieve an electronic document 3000 available for annotation or execution by one or more parties. At step 8200, system 2100 may transmit the electronic document 3000 for display on a first computing device 311 to the first computing device at a first location. At step 8300, system 2100, through user authentication unit, may authenticate an identity of a first user of the first computing device. At step 8350, system 2100 may receive electronic signals representing an user input of the first user from the first computing device. At step 8400, system 2100 may generate digital data representative of an indicia based the user input of the first user from the first computing device. At step 8500, system 2100 may apply the digital data to the electronic document to form a first annotation or signature from the first user.

At step 8600, which is optional, system 2100 may, in some embodiments, generate a digital compliance audit certificate 5000. The process of generating the CAC 5000 may include: receiving, from the first computing device, electronic signals representing an additional user input of the first user; generating digital data representative of a second indicia based the additional user input of the first user from the first computing device; applying the digital data to a digital compliance audit certificate associated with the electronic document to form a second annotation or signature from the first user; and storing the digital compliance audit certificate on a database.

A sequential signing session is created when a document is sent to recipients following a defined order of signing. Each recipient will sign the electronic copy of document 3000 in turn, and will be notified when it is their respective turn to sign the document. That is, a signature from a first recipient or party needs to be generated and applied to the electronic document 3000 before it may be sent to the second recipient for execution, and so on. After the step of applying the digital data to the electronic document to form the first annotation or signature from the first user, system 2100 may: transmit the annotated or signed electronic document by the first user for display on a second computing device to the second computing device at a second location; authenticate an identity of a second user of the second computing device; receive electronic signals representing an user input of the second user from the second computing device; generate digital data representative of an indicia based the user input of the second user from the second computing device; and apply the digital data to the electronic document to form a first annotation or signature from the second user. Each signer may receive a copy of document once signed for his or her own records.

In a concurrent or counterpart signing session (see "In Counterparts" in FIG. 12), system 2100 may send a copy of each document to many recipients (e.g. parties) at once. Each signer gets their own version of the document to sign. Documents used in this signing mode may be legally accepted as signed in counterparts. System 2100 may, concurrently with transmitting the electronic document for display on the first computing device to the first computing device, transmit the electronic document for display on a second computing device to the second computing device at a second location. System 2100 can then: authenticate an identity of a second user of the second computing device; receive electronic signals representing an user input of the second user from the second computing device; generate digital data representative of an indicia based the user input of the second user from the second computing device; and apply the digital data to the electronic document to form a first annotation or signature from the second user.

For example, a single shareholder agreement document 3000 can be sent to all fifty shareholders, and each shareholder can receive an individual copy of the agreement. The individual copy of the agreement may be identical across all shareholders, or it may be customized based on each shareholder's name and other information. Each shareholder (i.e. signer) does not need to wait for someone else to finish signing prior to signing his or her copy of the agreement. In addition, the corresponding master file document 7000 for the agreement 3000 can be accessed and edited in real-time based on concurrent user inputs from multiple signers.

In some embodiments, system 2100 may further receive, from the first computing device, electronic signals representing a signature of a person different from the first user; and apply the signature of the person different from the first user on the digital compliance audit certificate associated with the electronic document.

In some embodiments, system 2100 may retrieve the digital compliance audit certificate from the database; and produce a physical copy of the digital compliance audit certificate using a printing device configured to reproduce biomechanically accurate handwriting on a physical medium, wherein the physical copy of the digital compliance audit certificate includes a biomechanically accurate wet ink signature of the first user based on the first annotation or signature from the first user.

In some embodiments, the handwriting of the user is received by the first computing device through an input device comprising one of: a finger via a touchscreen, a mouse, and a stylus. Applying the generated indicia to the electronic document may include applying the handwriting through the input device configured to measure at least two of: points of pressure, thickness of lines, and cadence of handwriting of the first user.

In some embodiments, the user input include one or more typed strings and the indicia generated may include a visual icon, a hash code, or a combination of both. The visual icon and the hash code may each be unique so as to represent an unique handwriting. The unique visual icon or the hash code is, in some embodiments, generated based on one or more of: a length of the typed string, a font of the typed string, a timestamp of the typed string, an IP address associated with the first computing device, a MAC address of the first computing device, and hardware information of the first computing device.

Figure 11:
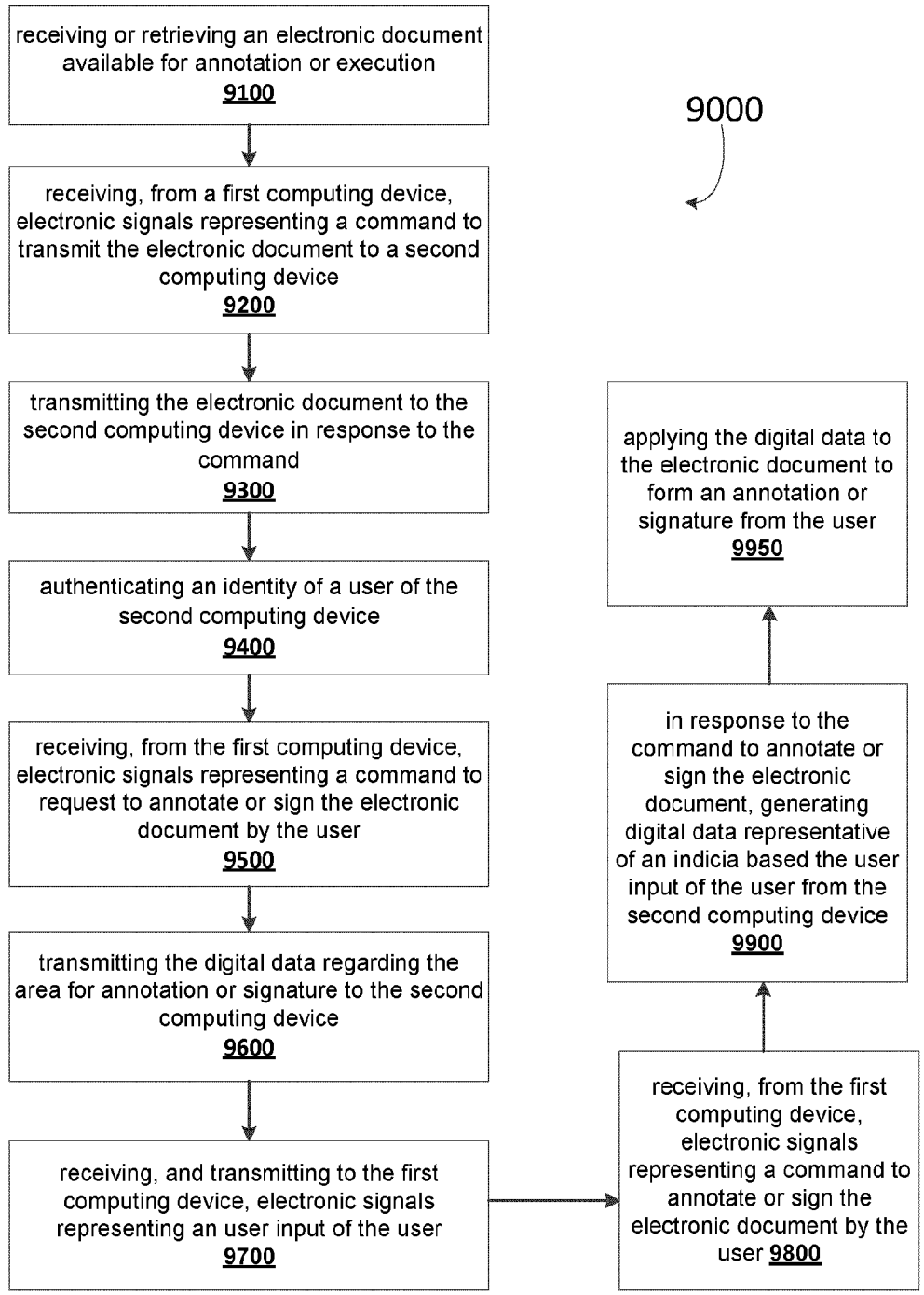
FIG. 11 illustrates a flow diagram of another example process for executing or annotating a document, according to some embodiments.

FIG. 11 illustrates a flow diagram of another example process 9000 for executing or annotating an electronic document 3000 in a live session by a plurality of parties, according to some embodiments. A live signing session allows a creator of a signing session (e.g. a user who has sent an electronic document 3000 to others for signing) to maintain control and ownership of the document while securing single use signatures from signers in a shared screen session. In some embodiments, signers will not receive a link, in this case, to the document but will instead be sent a link to a signature pad during the screen share session.

For example, through a live session, an agent or employee of a corporation (e.g. an financial institution) may guide a user through an electronic document 3000 and have control over where and when the user may sign or annotate the electronic document. For instance, a bank employee 2600 may request to display a mortgage agreement contract 3000 concurrently via a display at the first client terminal 2300 and a second client terminal 2500. The second client terminal 2500 may be next to a bank customer 2800 that is at a remote location from the first client terminal 2500. So the bank customer 2800 through client terminal 2500 may, after his or her identity has been authenticated, be shown the contract document and be guided through the document in order to execute the contract in full.

At step 9100, system 2100 may receive or retrieve an electronic document available for annotation or execution by one or more parties. At step 9200, system 2100 may, receive, from a first computing device at a first location, electronic signals representing a command to transmit the electronic document to a second computing device at a second location. At step 9300, system 2100 may transmit the electronic document for display on the second computing device to the second computing device in response to the command. At step 9400, system 2100 may authenticate an identity of a user of the second computing device. At step 9500, system may receive, from the first computing device, electronic signals representing a command to request to annotate or sign the electronic document by the user of the second computing device, the command comprising digital data regarding an area for annotation or signature within the electronic document. At step 9600, system may transmit the digital data regarding the area for annotation or signature to the second computing device, so that the second computing device is operable to display the area for annotation or signature within the electronic document to the user. At step 9700, system may receive, and transmit, to the first computing device, electronic signals representing an user input of the user from the second computing device. At step 9800, system may receive, from the first computing device, electronic signals representing a command to annotate or sign the electronic document by the user of the second computing device. At step 9900, system 2100 may, in response to the command to annotate or sign the electronic document, generate digital data representative of an indicia based the user input of the user from the second computing device. At step 9950, system may apply the digital data to the electronic document to form an annotation or signature from the user.

In some embodiments, system 2100 may transmit the electronic document for display on the first computing device to the first computing device, which may be associated with a user 2600 that is guiding the user 2800 at the second computing device through the electronic document 3000.

In some embodiments, system 2100 may be configured to: receive, from the second computing device, electronic signals representing an additional user input of the user; generate digital data representative of a second indicia based the additional user input of the user from the second computing device; apply the digital data to a digital compliance audit certificate associated with the electronic document to form a second annotation or signature from the user; and store the digital compliance audit certificate on a database.

In some embodiments, system 2100 may: receive, from the second computing device, electronic signals representing a signature of a person different from the user; and apply the signature of the person different from the user on the digital compliance audit certificate associated with the electronic document.

Figure 14:
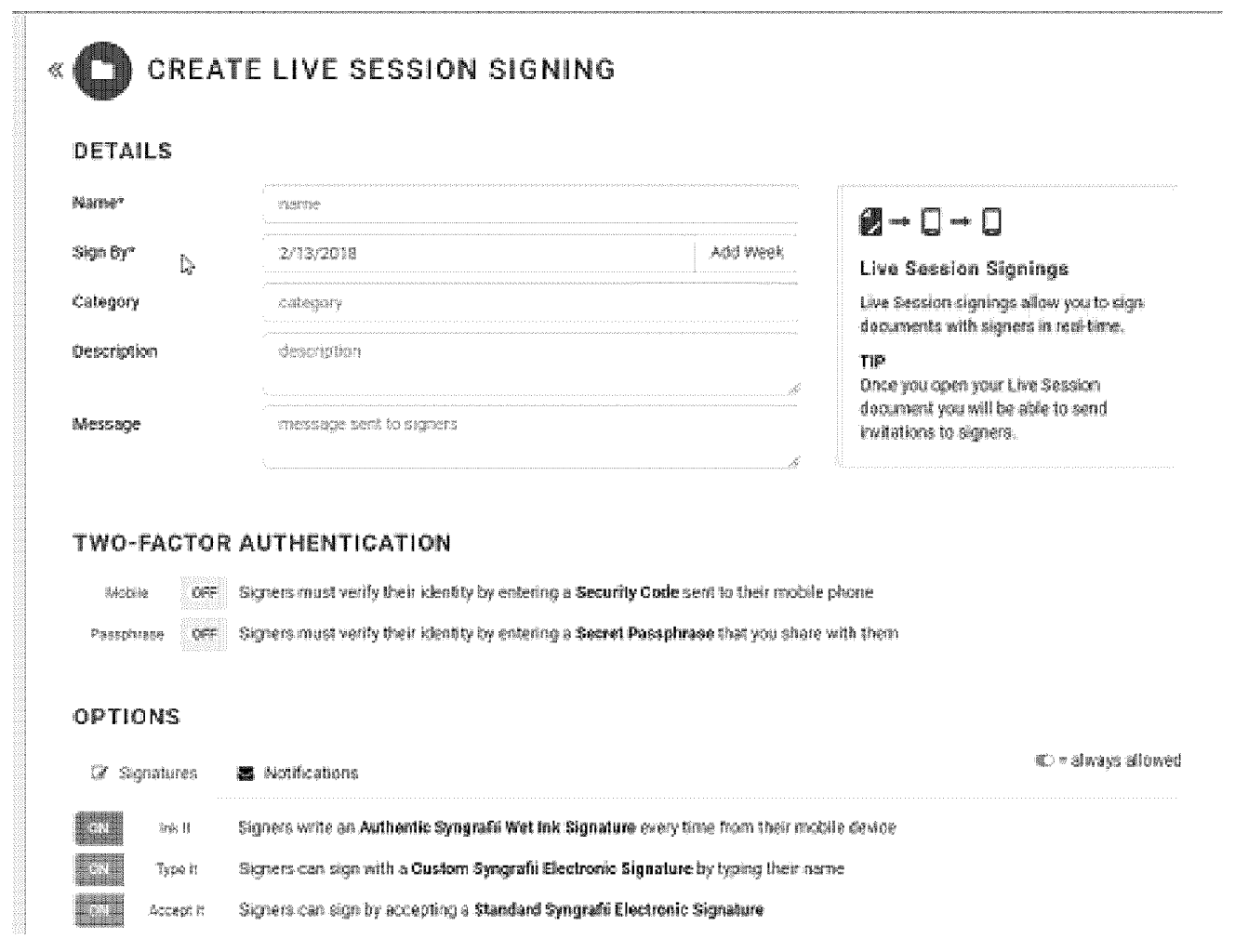

FIG. 14 illustrates an example user interface for initiating a live session of document signing. A user may initiate a live signing session for a document by first filling out details of the document to be signed. The details may include name of the user, an expiry date of the invitation to sign the document (e.g. the invitation link ceases to work past the expiry date), a category of the document, description of the document, and a message to one or more signers, if needed. The user may specify if a two-factor authentication is needed. The first factor may be a mobile authentication step, which if selected request a signer to verify an identity by entering a security code sent to his or her mobile phone number (see e.g. FIG. 15B). The mobile phone number may be pre-registered with system 2100 or may be entered at a separate step. The second factor may be a passphrase authentication step, which if selected request a signer to verify an identify by entering a passphrase that may be communicated to the signer through a different channel (e.g. verbally, via text message or via e-mail). The user may choose to upload a document in an appropriate format (e.g. Word or PDF) for the purpose of being signed or annotated. In some embodiments, the document may be converted to a PDF format once uploaded.

The user initiating the live session may specify the types of signatures that may be accepted by the document 3000. "Ink" signature may refer to a digital ink signature that is received and verified by system 2100 as authentic, biometrically and biomechanically accurate signature. For example, the digital ink signature may be entered via a touchscreen of a computing device 311 (e.g. a mobile device) by a signer using a finger or a stylus. "Typed" signature may refer to a digital signature that is generated based on a typed string entered by a signer through computing device 311. The typed string may be the signer's name. "Accepted" signature may refer to a digital signature that is automatically generated by system 2100 accepted by a signer. All of the three signatures are further described in detail below.

Figure 15A:
FIG. 15A illustrates an example interface for entering signer information for signing or annotation a document, according to some embodiments.
Figure 15B:
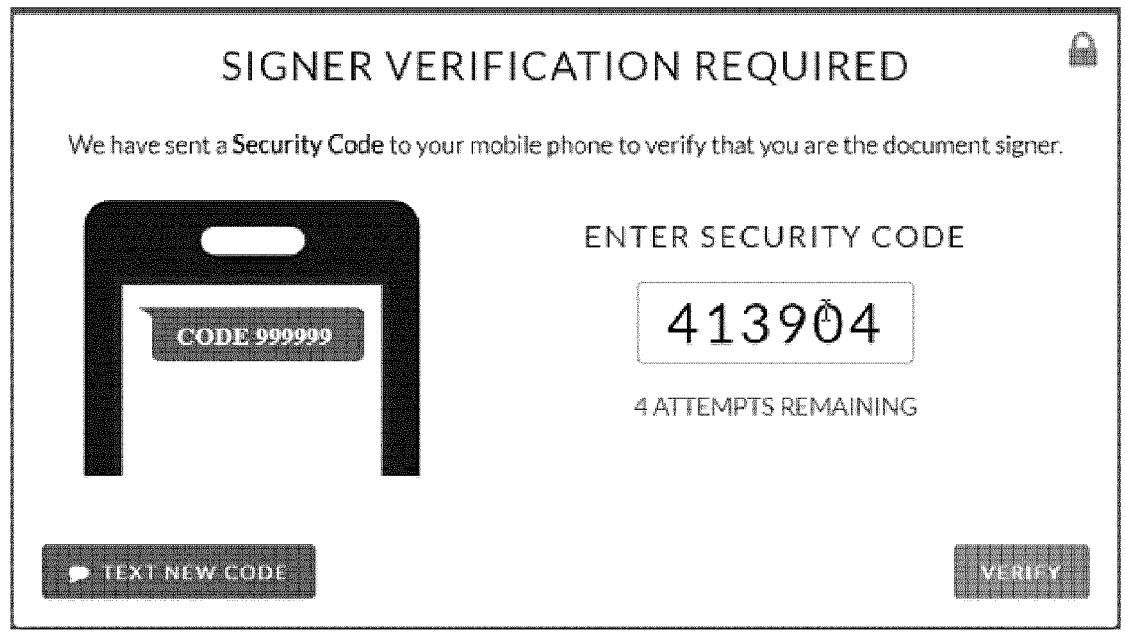
FIG. 15B illustrates an example verification page for identity authentication, according to some embodiments.

FIG. 15A shows an example user interface for registering one or more signers to a live signing session of an electronic document. Both e-mail and mobile phone numbers of each signer may be needed for a signing session. A similar interface may be used for registering signers to a sequential or in counterparts signing session. In some embodiments, the user initiating the signing session is automatically added as a signer.

In some embodiments, system 2100 may implement a web server and render a user interface using HTML5. A client computing device 311 may receive the invitation link sent by a user initiating a signing session, gets authenticated (e.g. via a text message code to a phone or a passphrase), log into a user interface of system 2100 through a browser, and start a signing session (sequential, in counterparts, or via live session) using client computing device 311, as long as device 311 is connected to the Internet.

FIG. 16 illustrates an example user interface displayed once an invitation has been received by a signer's e-mail inbox. As shown, two electronic documents 3000*a*, 3000*b* are available for execution, and the invitation link for signing will expire in 8 days.

Figure 17:
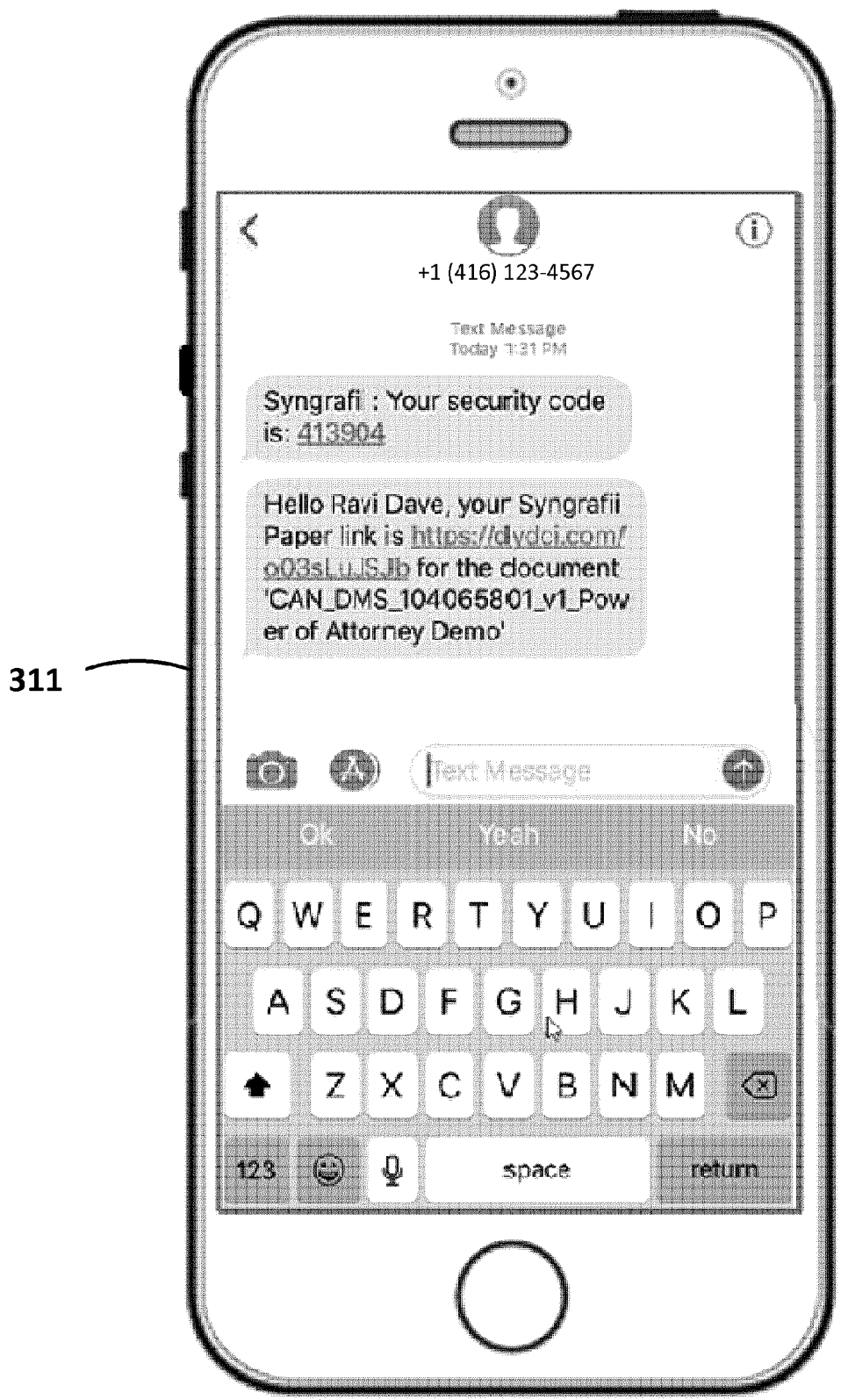
FIG. 17 illustrates an example client computing device interface, according to some embodiments.

FIG. 17 illustrates an example interface at client computing device 311 once a user clicks on one of the document links. Once a signer has clicked on a link for an electronic document 3000*a* shown in FIG. 16, a security code may be sent to the registered mobile number for the signer. Once properly authenticated, a specific document link may be sent to the mobile device for signing.

Figure 18A:

FIGS. 18A, 18B and 18C illustrate example interfaces for signing or annotating a document 3000, according to some embodiments. As shown in FIG. 18A is an example electronic document 3000 (e.g. Line of Credit Application) that is displayed at a client computing device 311 once the user identity for the signer has been authenticated. Document 3000 may have a body 3100 listing detailed terms and conditions or other content. The body 3100 may have various fields (e.g. first name, last name, address) which a user can fill, or may be pre-populated already. Document 3000 may also have a signature field 3200 and a date field 3300. Document 3000 may optionally include a QR code 3400 as described above. The QR code (or a bar code) may be used to retrieve a specific page of document 3000, and associated audit trail including the master file.

The signer may choose to sign or annotate document 3000 by hover a cursor above area where the user wishes to sign or annotate. The cursor may be controlled by an input signal received through an input device, such as a mouse, a keyboard, a stylus, or a finger. In some embodiments, a document 3000 may be partially locked by system 2100 such that only part of the document may be signed or annotated. In other embodiments, the entire document 3000 may be available for signing or annotation.

Once a signer has decided to sign or annotate, an input signal may be sent to system 2100, which in turn may prompt a display of signature panel 3250 (see e.g. FIG. 18B). Signature panel 3250 provides one or more options for signing or annotation: sign, initial or switch. The switch option allows a user to switch between a selected option (e.g. "sign") to a different options (e.g. "initial").

Figure 20A:
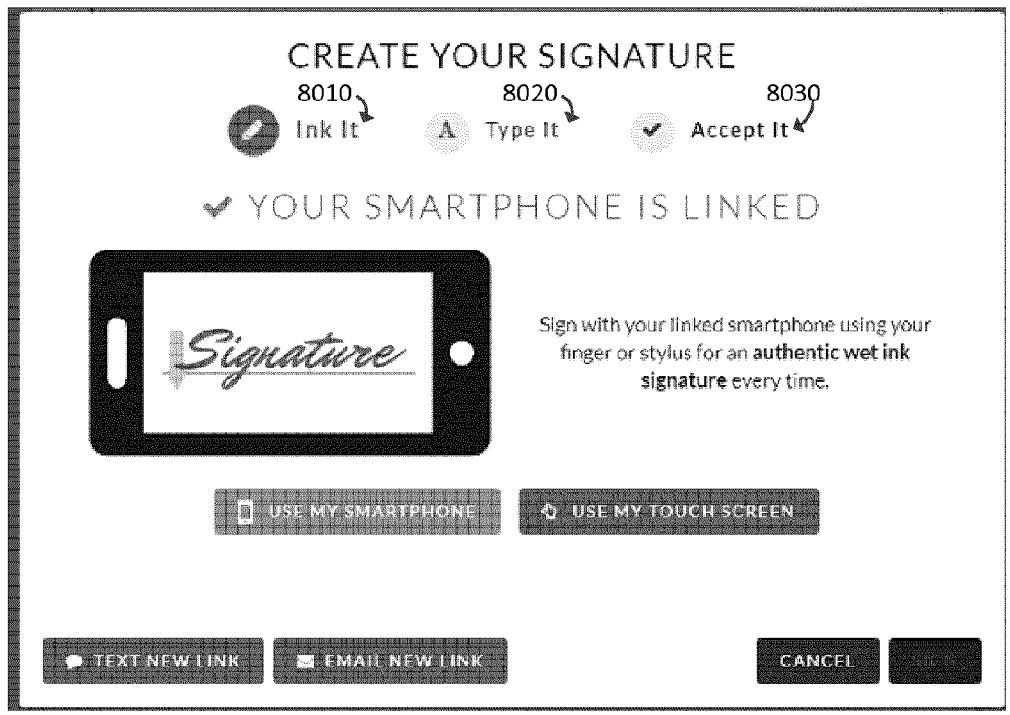
FIG. 20A illustrates an example interface for generating a digital signature through a client computing device, according to some embodiments.

If the "sign" option on signature panel 3250 is chosen, a "Create Your Signature" interface may be displayed to the signer at client computing device 311, as shown in FIG. 20A. There may be one or more options for creating a signature: ink it 8010, type it 8020, and accept it 8030. "Ink" signature may refer to a digital "wet ink" signature that is received and verified by system 2100 as authentic, biometrically and biomechanically accurate signature that resembles a user's handwriting. "Typed" signature may refer to a digital signature that is generated based on a typed string entered by a signer through computing device 311, which may be qualified as a forensically and legally defensible signature based on CAC 5000 or master file 7000. The typed string may be the signer's name. "Accepted" signature may refer to a digital signature that is automatically generated by system 2100 accepted by a signer, which may also qualify as a forensically and legally defensible signature based on CAC 5000 or master file 7000.

Figure 19A:
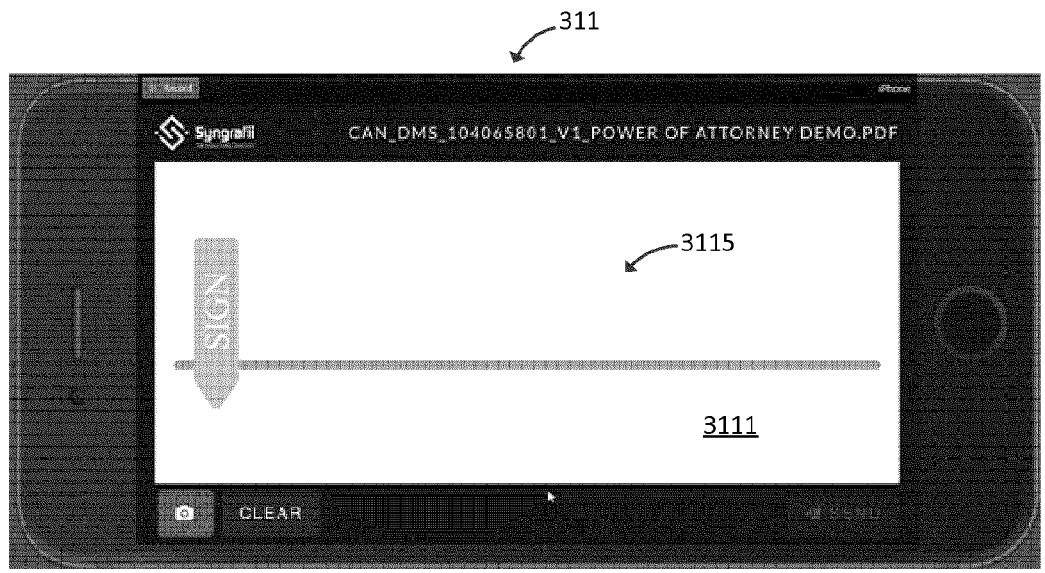
FIGS. 19A and 19B illustrate example interfaces for providing a digital signature through a client computing device, according to some embodiments.
Figure 19B:
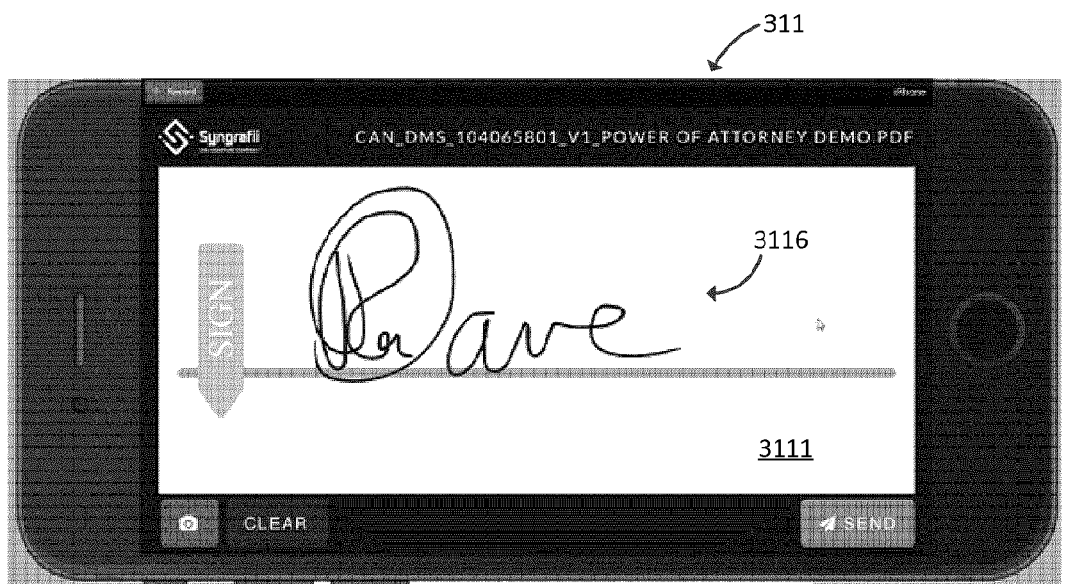

Referring now to FIGS. 19A and 19B, which illustrate example interfaces for providing a digital wet ink signature through a client computing device 311, if a signer chooses to "ink it" 8010 at the step shown in FIG. 20A. FIG. 19A illustrates a display screen 3111 of client computing device 311. A signature field 3115 is shown and ready for user input. FIG. 19B shows an user input 3116 made by a signer. The user input 3116 includes a digital wet ink signature entered using an input device such as a stylus, a digital pen, or a finger. As user input 3116 is entered by signer using client computing device 311, a number of characteristics of the user input 3116 may be captured by client computing device 311 and transmitted to system 2100. For example, cadence, speed, time and date stamps, location, xy coordinates, device ID of computing device 311, hardware information of computing device 311, byte count, acceleration and deceleration of each stroke, and other types of information associated with user input 3116 may be detected and captured by computing device 311 in real-time or near real-time, and transmitted to system 2100.

In some embodiments, client computing device 311 may detect a pressure of each point, which may include one or more pixels, of user input 3116, as applied by the signer during the course of entering the user input.

Figure 21:
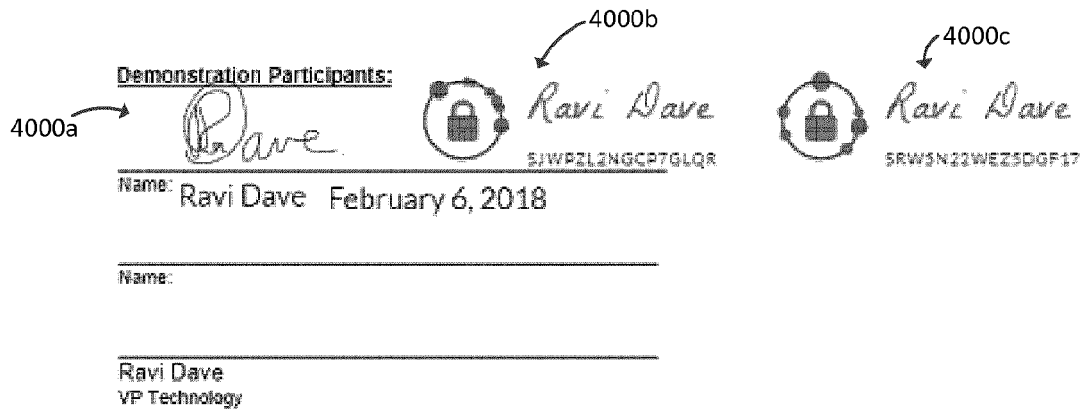
FIG. 21 illustrates part of an example electronic document with digital signatures, according to some embodiments.

A signer may then click on "send" via computing device 311 shown in FIG. 19B, which transmits a command signal to system 2100 to apply this digital wet ink signature 4000*a* to document 3000 as a formal signature 4000*a*, as shown in FIG. 21. This signature 4000*a* can be later on verified to exist on a specific page of a specific document. In some embodiments, the command signal may cause user input 3116 to be attached to a cursor hovering over document 3000, and may be inserted into document 3000 by the signer at a pre-defined signature field 3200. In some embodiments, a text box may be added to document 3000 before the signature 4000a is applied with the text box on document 3000.

Figure 20B:
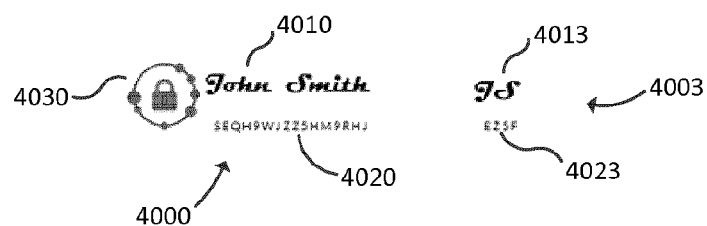
FIGS. 20B, 20C and 20D illustrate various interfaces for generating a digital signature through a client computing device, according to some embodiments.
Figure 20C:
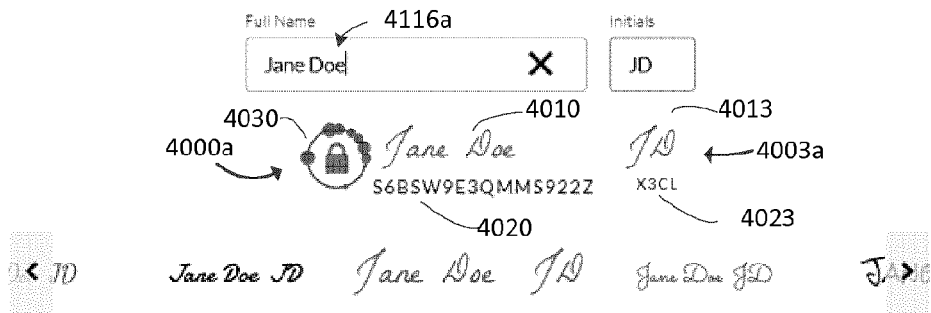
Figure 20D:
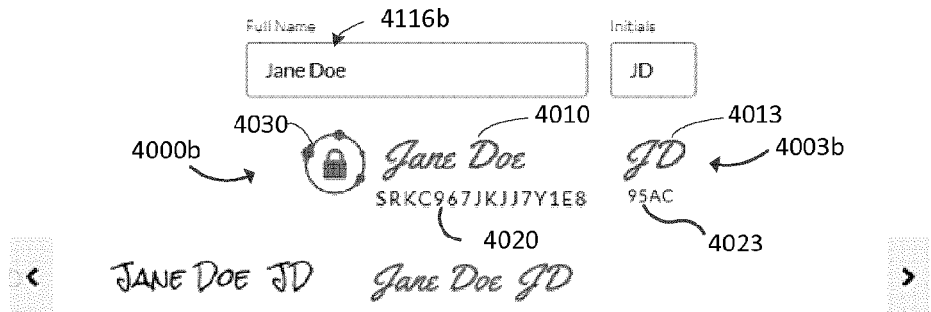

If a signer chooses to "create it" 8020 at the step shown in FIG. 20A, the signer may be taken to a user interface displayed in FIGS. 20C and 20D. A signer may type a string 4116a, 4116b, such as full name (e.g. "Jane Doe"), into a given field, in order to create an unique indicia 4000a, 4000b that may be used as a digital signature that is legally and forensically defensible and tamper-proof. A signer may also type his or her initial (e.g. "JD") in order to generate an initial 4003a, 4003b.

If a signer chooses to "accept it" 8030 at the step shown in FIG. 20A, the signer may be taken to a user interface displayed in FIG. 20B. At this stage, system 2100 already has information representing the signer's name, so it may cause client computing device 311 to automatically create an unique indicia 4000 or an unique initial 4003. The indicia 4000 may include a generated digital signature 4010, a hash code 4020 and a visual icon 4030. The initial 4003 may include an generated initial 4013 and a corresponding hash code 4023.

In some embodiments, an indicia 4000a, 4000b may include three parts: a generated digital signature 4010, a hash code 4020 and a visual icon 4030. Digital signature 4010 may be generated based on user input 4116a, 4116b. For example, digital signature 4010 may be a typed name in a specific font, which may be selectable by a signer. Hash code 4020 may be a code including a plurality of digital characters such as numbers and/or letters, and is generated automatically based on a number of factors related to the user input 4116a, 4116b. For example the factors may include one or more of: a user identity, a length of the typed string, a font of the typed string, a timestamp of the typed string, an IP address associated with the computing device 311, a MAC address of the computing device 311, and hardware information of the computing device 311. The timestamp of the typed string may include both date and time information at the time a typed string, or each character of the typed string, is received by client computing device 311. Visual icon 4030 may also be automatically generated based on a similar set of factors related to the user input 4116a, 4116b as those used to generate hash code 4020. In some embodiments, the hash code 4020 and the visual icon 4030 may be generated each based on a different set of factors.

Since a timestamp of a first typed string 4116a is different from a timestamp of a second typed string 4116b typed by the same signer, a hash code 4020 generated based on at least the timestamp information is always unique. For example, as shown in FIGS. 20C and 20D, the same user input "Jane Doe", entered by the same signer at different times, has generated different hash codes 4020 an different visual icon 4030.

In addition, visual icon 4030 may be also unique to each typed user input 4116a, 4116b. For example, the dots around the visual lock icon may vary in number, size, diameter and position.

The initial 4003 may include an generated initial 4013 and a corresponding hash code 4023, similarly generated.

FIG. 18C shows an example digital signature 4000 and date 4300 generated based on user input received by system 2100 and subsequently applied to document 3000. In some embodiments, the digital signature may be an unique indicia 4000. Indicia 4000 may include one or more of: a generated digital signature 4010, an unique hash code 4020, and an unique visual icon 4030. A date 4300 may also be inserted into document 3000. The date may be automatically generated based on system date, or it may be inserted based on user input.

FIG. 21 illustrates three types of signatures applied to document 3000: digital wet ink signature 4000a through the "ink it" method 8010, a generated indicia 4000b based on typed user input through the "type it" method 8020, and a generated indicia 4000c based on a signer's accepted signature through the "accept it" method 8030.

Figure 22:
FIG. 22 illustrates part of an example compliance audit certificate, according to some embodiments.
Figure 23A:

FIG. 22 illustrates part of an example compliance audit certificate (CAC) 5000, according to some embodiments. CAC 5000 may be a digital document that is appended at the end of an executed version 3500 of electronic document. As shown, CAC 5000 may include a QR code 3400 that if scanned may retrieve part or all of the CAC 5000. In some embodiments, the QR code 3400 may be scanned to retrieve the entire electronic document associated with CAC 5000. A signature 4000 and corresponding supporting identification in the form of a business card 5100 are also present to indicate that the signer intends for the signature(s) applied to the associated electronic document to be legally binding.

FIGS. 23A, 23B, 23C and 23D illustrate various parts of a master file 7000, according to some embodiments. Master file 7000 may include, in some embodiments, one or more of the following data items: an executed version 3500 of the electronic document; details 7001 of the signed electronic document such as signing session type, document owner, document upload date and time, and upload method; a summary of signatures 7002; a list of all signers 7005; an access history 7006 listing details of any failed or successful attempt by a user to access the electronic document; a notification history 7007 listing details of all correspondence and communication sent by system 2100 relating to the electronic document; a list of mobile signatures 7008 added by one or more signers through one or more devices; a list of mobile images 7009 added by one or more signers through one or more devices; a signing log 7010 listing details of each signer such as name, email, mobile number, total time spent on all the signatures, a summary of text boxes, annotations or images added, and a summary of signatures received or generated by system 2100 for the signer.

In some embodiments, a signing log 7010 may, as shown in FIGS. 23C and 23D, include data representing each signer's access history at each page of the document. The log may include information regarding, for example, a date and time of each access, the specific page being accessed, whether the signer has entered or exited the specific page, time spent at each page that has been accessed, an IP address associated with the client computing device used to access the specific page, and any signature 4000a, 4000b, 4000c that has been added to one or more specific pages. Signing log 7010 may further include any supporting ID documents 5100 that has been added to any specific page.

In some embodiments, notification history 7007 may include, for example, security code sent to a particular signer at a particular mobile number or e-mail address, a mobile link sent to a particular mobile number, and a link of an executed document sent to a user.

In some embodiments, master file 7000 may include audio or video data stream recording one or more signers applying one or more signatures to the electronic document 3000.

In some embodiments, master file 7000 may include CAC 5000 as well as pressure profile associated with each signature within the executed electronic document.

Master file 7000 may thus provide a secure audit trail, in the form of a secure electronic record, which can prevent a user from removing or editing signatures or annotations from an executed version of the electronic document. Master file 7000 may improve the likelihood that the executed version of electronic document (e.g. signed contract) will be upheld and that attempts to repudiate the agreement will be unsuccessful.

The scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufactures, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufactures, compositions of matter, means, methods, or steps. As can be understood, the detailed embodiments described above and illustrated are intended to be examples only. Variations, alternative configurations, alternative components and modifications may be made to these example embodiments. The invention is defined by the claims.

What is claimed is:

1. A computer-implemented method for annotating or signing an electronic document, the method comprising:
   receiving or retrieving an electronic document available for annotation or execution by one or more parties;
   transmitting the electronic document for display on a first computing device to the first computing device at a first location;
   authenticating an identity of a first user of the first computing device;
   receiving electronic signals representing an user input of the first user from the first computing device, wherein the user input of the first user comprises a typed sting;
   generating digital data representative of an indicia based the user input of the first user from the first computing device;
   applying the digital data to the electronic document to form a first annotation or signature from the first user; and
   rendering for display, at the first computing device, the first annotation or signature as a composite visual representation comprising at least:
      a first visual element showing the typed string rendered in a font selected by the first user; and
      a second visual element showing an unique hash code randomly generated based on a timestamp of the typed sting;
   wherein when a second user input is received from the first user, a different composite visual representation comprising a different hash code generated based on a timestamp of the second user input is rendered for display at the first computing device.

2. The method of claim 1, further comprising:
   receiving, from the first computing device, electronic signals representing an additional user input of the first user;
   generating digital data representative of a second indicia based the additional user input of the first user from the first computing device;
   applying the digital data to a digital compliance audit certificate associated with the electronic document to form a second annotation or signature from the first user; and
   storing the digital compliance audit certificate on a database.

3. The method of claim 2, further comprising:
   receiving, from the first computing device, electronic signals representing a signature of a person different from the first user; and
   applying the signature of the person different from the first user on the digital compliance audit certificate associated with the electronic document.

4. The method of claim 1, further comprising:
   concurrently with transmitting the electronic document for display on the first computing device to the first computing device, transmitting the electronic document for display on a second computing device to the second computing device at a second location;
   authenticating an identity of a second user of the second computing device;
   receiving electronic signals representing an user input of the second user from the second computing device;
   generating digital data representative of an indicia based the user input of the second user from the second computing device; and
   applying the digital data to the electronic document to form a first annotation or signature from the second user.

5. The method of claim 2, wherein the digital compliance audit certificate further comprises at least one of:
   identity authentication results, handwriting data, GPS location data, MAC address, IP addresses, hardware information relating to the first computing device, audio communication stream, visual communication stream, browsing information, and a time duration of displaying the electronic document at the first computing device.

6. The method of claim 1, wherein the user input of the first user further comprises a handwriting of the user received by an input device configured to measure at least two of: points of pressure, thickness of lines, and cadence of handwriting of the first user, and the generated indicia based the user input comprises the handwriting of the user.

7. The method of claim 1, further comprising generating a master file for the electronic document, the master file comprising at least a pressure profile of the first annotation or signature based on the user input of the first user, the pressure profile being unique and corresponding to the digital data representative of the indicia.

8. The method of claim 7, wherein the pressure profile comprises at least one of: cadence, speed, timestamp, date stamp, x-y coordinates of the first annotation or signature, byte count of the first annotation or signature, a device ID, and device information of the first computing device.

9. The method of claim 1, further comprising:
   assigning or retrieving an address of the electronic document on a blockchain;
   authenticating the first user as a valid party to the electronic document before applying the digital data to the electronic document to form the first annotation or signature from the first user;
   encrypting and storing an edited version of the electronic document including the first annotation or signature in a block on the blockchain; and
   assigning or retrieving an address of the block storing the edited version of the electronic document.

10. The method of claim 9, wherein the block storing the edited version of the electronic document further comprises one or more of: a user identity, a timestamp associated with the first annotation or signature, the first annotation or signature, a digital compliance audit certificate, and a pressure profile.

11. A computer system for annotating or signing an electronic document, the computer system comprising:
  a processor; and
  a non-transitory computer-readable memory device storing machine-readable instructions;
  wherein the processor is configured to, when executing the machine-readable instructions, perform the steps of:
    receiving or retrieving an electronic document available for annotation or execution by one or more parties;
    transmitting the electronic document for display on a first computing device to the first computing device at a first location;
    authenticating an identity of a first user of the first computing device;
    receiving electronic signals representing an user input of the first user from the first computing device, wherein the user input of the first user comprises a typed string;
    generating digital data representative of an indicia based the user input of the first user from the first computing device;
    applying the digital data to the electronic document to form a first annotation or signature from the first user; and
    rendering for display, at the first computing device, the first annotation or signature as a composite visual representation comprising at least:
      a first visual element showing the typed string rendered in a font selected by the first user; and
      a second visual element showing an unique hash code randomly generated based on a timestamp of the typed sting;
    wherein when a second user input is received from the first user, a different composite visual representation comprising a different hash code generated based on a timestamp of the second user input is rendered for display at the first computing device.

12. The system of claim 11, wherein the processor is configured to perform:
  receiving, from the first computing device, electronic signals representing an additional user input of the first user;
  generating digital data representative of a second indicia based the additional user input of the first user from the first computing device;
  applying the digital data to a digital compliance audit certificate associated with the electronic document to form a second annotation or signature from the first user; and
  storing the digital compliance audit certificate on a database.

13. The system of claim 12, wherein the processor is configured to perform:
  receiving, from the first computing device, electronic signals representing a signature of a person different from the first user; and
  applying the signature of the person different from the first user on the digital compliance audit certificate associated with the electronic document.

14. The system of claim 11, wherein the processor is configured to perform:
  concurrently with transmitting the electronic document for display on the first computing device to the first computing device, transmitting the electronic document for display on a second computing device to the second computing device at a second location;
  authenticating an identity of a second user of the second computing device;
  receiving electronic signals representing an user input of the second user from the second computing device;
  generating digital data representative of an indicia based the user input of the second user from the second computing device; and
  applying the digital data to the electronic document to form a first annotation or signature from the second user.

15. The system of claim 12, wherein the digital compliance audit certificate further comprises at least one of:
  identity authentication results, handwriting data, GPS location data, MAC address, IP addresses, hardware information relating to the first computing device, audio communication stream, visual communication stream, browsing information, and a time duration of displaying the electronic document at the first computing device.

16. The system of claim 11, wherein the user input of the first user further comprises a handwriting of the user received by an input device configured to measure at least two of: points of pressure, thickness of lines, and cadence of handwriting of the first user and the generated indicia based the user input comprises the handwriting of the user.

17. The system of claim 11, wherein the processor is configured to generate a master file for the electronic document, the master file comprising at least a pressure profile of the first annotation or signature based on the user input of the first user, the pressure profile being unique and corresponding to the digital data representative of the indicia.

18. The system of claim 17, wherein the pressure profile comprises at least one of: cadence, speed, time stamp, date stamp, x-y coordinates of the first annotation or signature, byte count of the first annotation or signature, a device ID, and device information of the first computing device.

* * * * *